United States Patent [19]

Yasaka et al.

[11] Patent Number: 4,951,164
[45] Date of Patent: Aug. 21, 1990

[54] SINGLE MOTOR MAGNETIC RECORDING/PLAYBACK APPARATUS USING A WORM AND WORM WHEEL

[75] Inventors: Yoshio Yasaka, Gunma; Ken Motoi, Ota; Toshihiko Higashino, Gunma; Takahiro Okuie, Daito; Kazuyoshi Ogino, Kiryu, all of Japan

[73] Assignee: Sanyo Electric Co., Ltd., Moriguchi, Japan

[21] Appl. No.: 315,108

[22] Filed: Feb. 24, 1989

[30] Foreign Application Priority Data

Feb. 27, 1988 [JP] Japan .................................. 63-43324

[51] Int. Cl.5 .................. G11B 15/665; G11B 15/675
[52] U.S. Cl. ....................................... 360/85; 360/95; 360/96.5
[58] Field of Search .................... 360/85, 95, 93, 96.5, 360/96.6

[56] References Cited

U.S. PATENT DOCUMENTS

| | | | |
|---|---|---|---|
| 4,611,251 | 9/1986 | Yokoo | 360/85 |
| 4,661,864 | 4/1987 | Kuwajima | 360/85 |
| 4,685,009 | 8/1987 | Mia et al. | 360/95 |
| 4,752,845 | 6/1988 | Suzuki | 360/85 |

*Primary Examiner*—David J. Severin
*Attorney, Agent, or Firm*—Armstrong, Nikaido, Marmelstein, Kubovcik & Murray

[57] ABSTRACT

A magnetic recording/playback apparatus in which rotational torque from the drive shaft of a single motor is capable of being transmitted to a cassette loading mechanism and a tape loading mechanism includes a worm secured to the drive shaft and a worm wheel for being meshed freely with the worm, the worm wheel being provided with a toothless portion. The drive shaft is coupled to the cassette loading mechanism via the worm wheel. During operation of the tape loading mechanism by the drive shaft, the toothless portion of the worm wheel is brought into position opposite the worm wheel so that a driving force is no longer applied to the cassette loading mechanism. When a cassette is ejected, the toothless portion of the worm wheel is shifted after a tape loading operation, thereby reengaging the worm wheel and worm to actuate the cassette loading mechanism.

3 Claims, 29 Drawing Sheets

F I G. 20
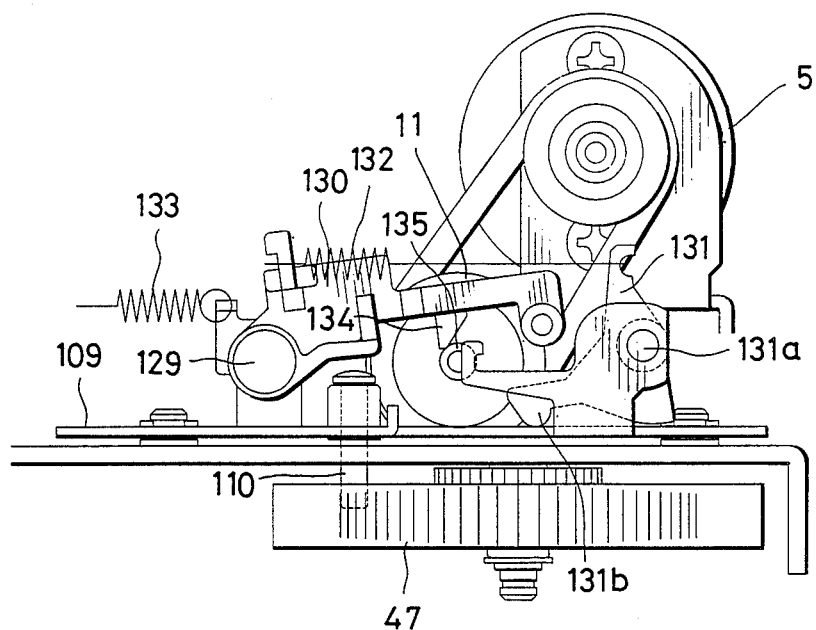
F I G. 21
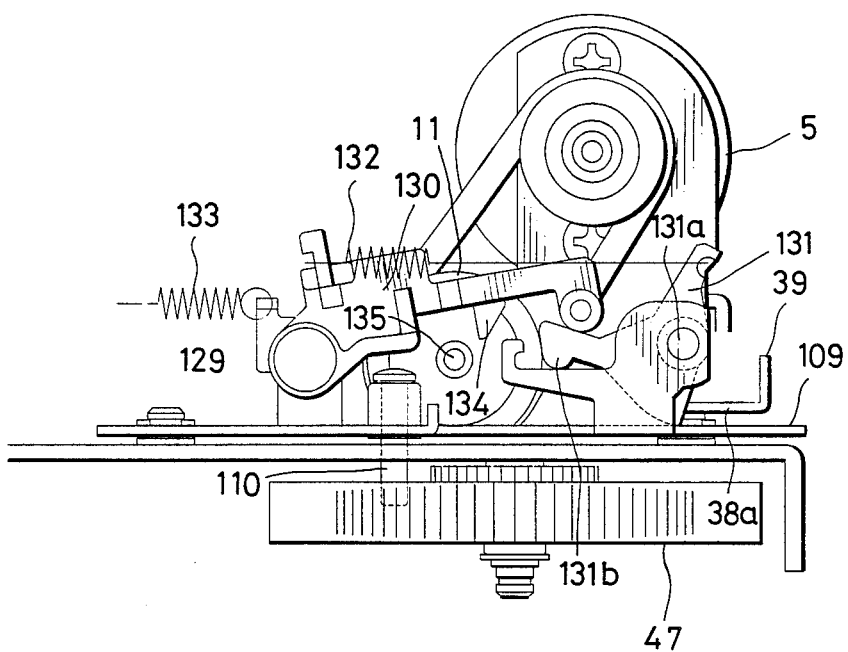

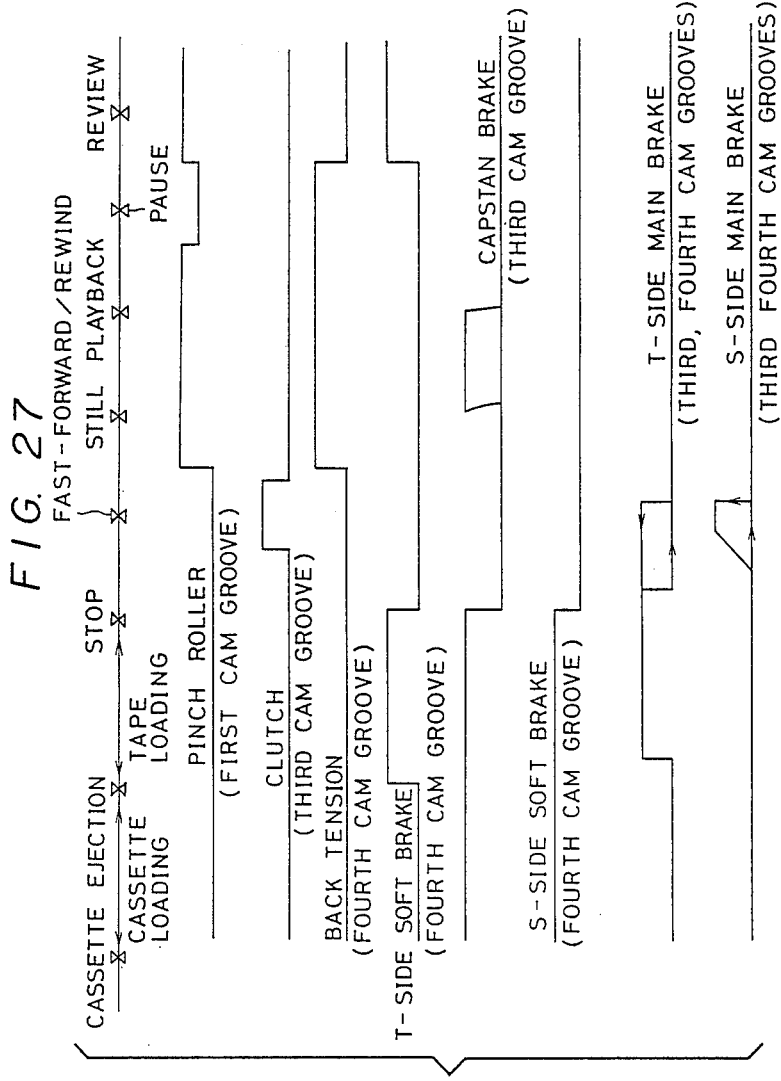

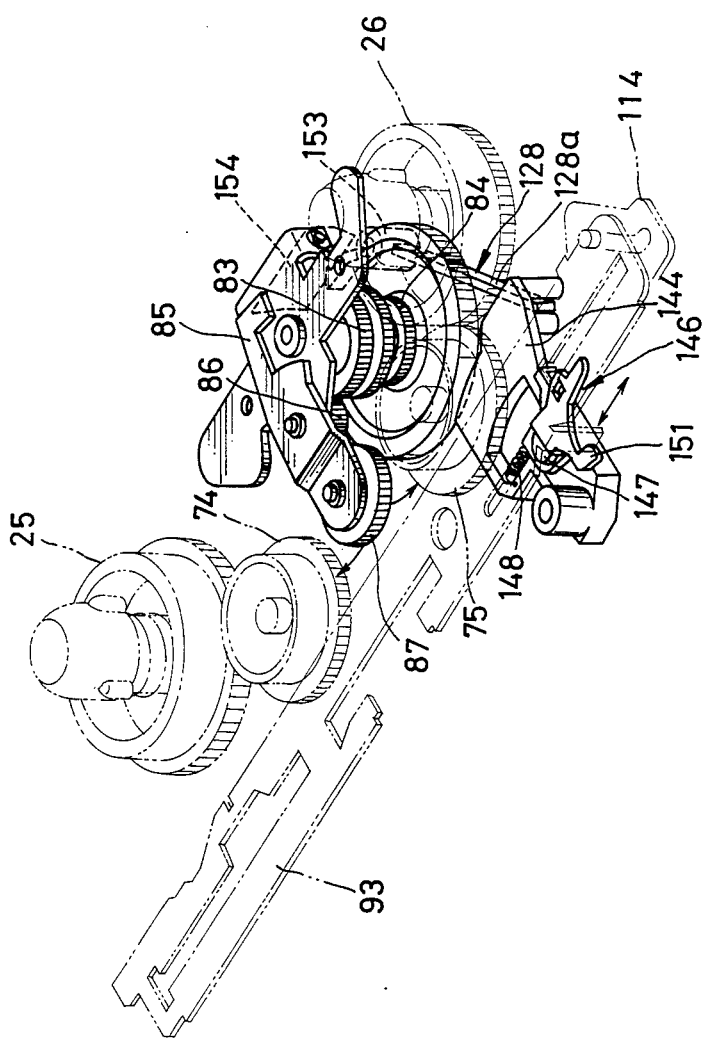

SINGLE MOTOR MAGNETIC RECORDING/PLAYBACK APPARATUS USING A WORM AND WORM WHEEL

BACKGROUND OF THE INVENTION

This invention relates to a magnetic recording/playback apparatus and, more particularly, to a magnetic recording/playback apparatus in which cassette and tape loading operations are made possible using a single drive motor.

A magnetic recording/playback apparatus (hereinafter referred to as a VTR, or video tape recorder) has a basic construction which includes a cassette loading mechanism, a tape loading mechanism, a tape feed mechanism and three motors for driving respective ones of these mechanisms. Since the arrangement using these three motors is such that space is required on the VTR chassis in order to install the motors, the VTR is large in size and high in cost, the latter because the motors themselves are costly. For this reason, attempts have been made to reduce the number of motors. One such example is disclosed in the specification of Japanese Patent Application Laid-Open (KOKAI) No. 61-289572. In this example of the prior art, two pulleys are secured to the output shaft of one motor, the rotational torque of the motor is transmitted to the cassette loading mechanism through one pulley, a belt and a clutch, and to the loading mechanism through the other pulley and its associated belt. During cassette loading, the rotational torque of the motor is transmitted to both the cassette and tape loading mechanisms. During tape loading, the clutch is released to interrupt the transmission of torque to the cassette loading mechanism. In other words, the clutch is engaged or disengaged in response to a signal produced when the cassette is received in the VTR at a predetermined position or when the cassette is ejected from the predetermined position, thereby controlling the transmission of rotational torque from the motor to the cassette loading mechanism.

Certain difficulties are encountered in the example of the prior art described above. Specifically, if the cassette becomes stuck during cassette loading, for example, rotational torque will continue to be transmitted from the motor to the tape loading mechanism irrespective of the fact that the pulley and belt on the cassette loading side are slipping. Consequently, when the angle of rotation of a cam exceeds a predetermined value, this is taken as meaning that the cassette has been received at its predetermined position and, hence, a tape pull-out section begins operating This is undesirable because the cassette is stuck and not actually in place, as mentioned above. Furthermore, to eject the cassette, the tape loading mechanism is actuated to re-accommodate the tape within the cassette, after which the cassette loading mechanism is actuated to eject the cassette. However, at the changeover in operation from tape loading to cassette loading, high-speed rotation on the side of the tape loading mechanism is transmitted to the side of the cassette loading mechanism via the clutch, as a result of which an offset in the engagement timing of the clutch occurs. When the VTR is operated the next time, this offset or shift in timing can cause the clutch to be released, resulting in starting of the tape loading operation, even though the cassette has not been received at its predetermined position.

SUMMARY OF THE INVENTION

An object of the present invention is to provide a magnetic recording/playback apparatus devoid of the aforementioned shortcomings encountered in the prior art.

According to the invention, rotational torque is transmitted from the motor to the tape loading mechanism during cassette loading. However, if the cassette becomes stuck, the motor output shaft is stopped to halt the motion of the tape loading mechanism. During tape loading, the transmission of rotational torque from the motor to the cassette loading mechanism is halted. This overcomes the shortcomings mentioned above.

More specifically, in accordance with the present invention, the foregoing object is attained by providing a magnetic recording/playback apparatus in which rotational torque from a drive shaft of a single motor is capable of being transmitted to a cassette loading mechanism and a tape loading mechanism to operate these mechanisms, comprising a worm secured to the drive shaft, a worm wheel for being meshed freely with the worm and for coupling the drive shaft to the cassette loading mechanism, the worm wheel having a toothed portion and a toothless portion, and worm wheel turning means for bringing the toothless portion of the worm wheel to a position opposite the worm during operation of the tape loading mechanism by the drive shaft.

In an embodiment of the invention, the worm wheel turning means comprises a cam face formed integral with the worm wheel and having a groove, and a spring-biased pin capable of sliding freely on the cam surface. When the pin is received within the groove, the pin applies a thrusting force against the groove surface, thereby turning the worm wheel so as to unmesh the worm and the worm wheel.

In this embodiment of the invention, the pin applies a thrusting force against the groove surface, thereby turning the worm wheel so as to mesh the worm and the worm wheel, when the pin is withdrawn from the groove by motion of a slide plate constituting the tape loading mechanism.

In operation, the worm and worm wheel are meshed during cassette loading to transmit the rotational torque of the motor to both the cassette and tape loading mechanisms. If a cassette should happen to become stuck, the worm wheel and worm stop rotating so that no power is transmitted to the tape loading mechanism. When the cassette is properly received at a predetermined position, the toothless portion of the worm wheel is brought into position opposite the worm, as a result of which the transmission of power to the cassette loading mechanism is suspended. When the cassette is ejected, the toothless portion of the worm wheel is shifted after a tape loading operation, thereby re-engaging the worm wheel and worm to actuate the cassette loading mechanism.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 19 through 26 are front views showing the correlation among a slide plate, a ratchet and a rotary shaft;

FIG. 27 is a chart showing the motions of various parts in various modes;

DESCRIPTION OF THE PREFERRED EMBODIMENT

Figure 1:
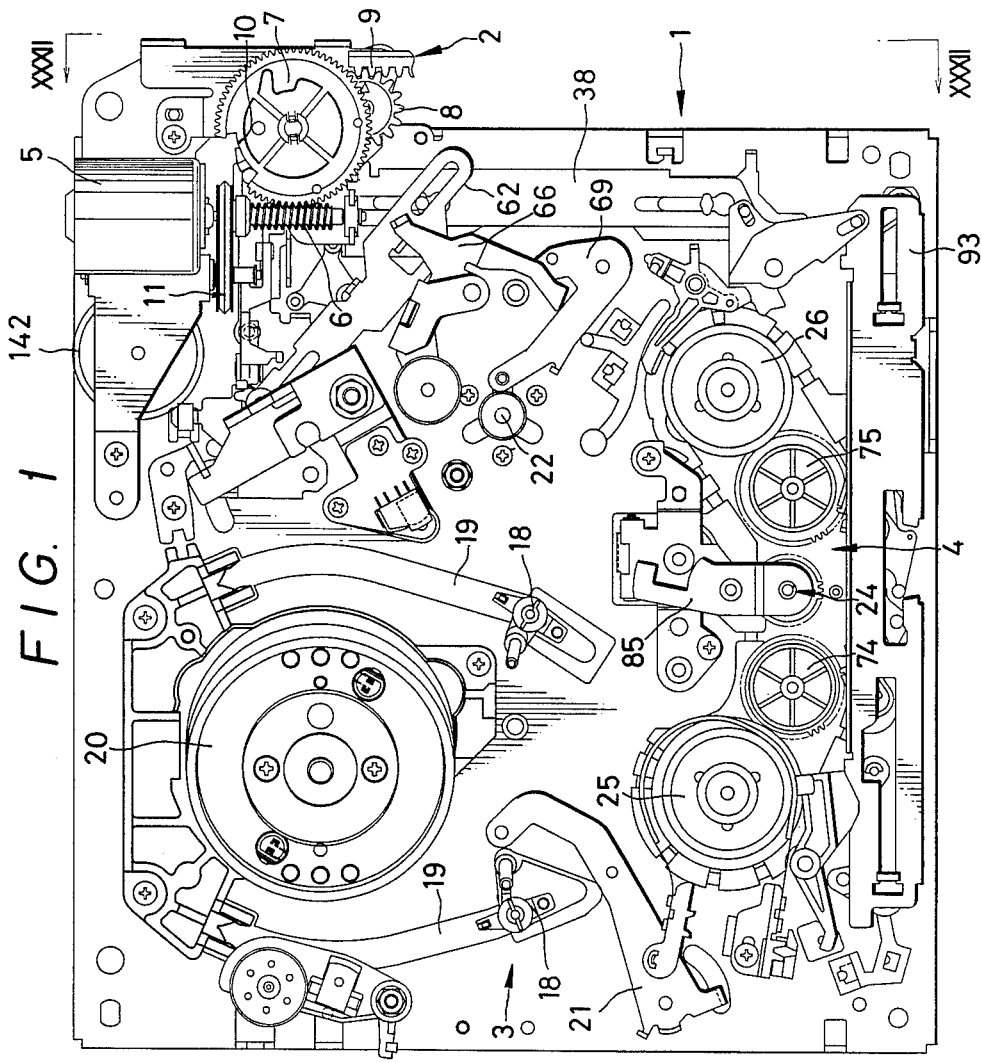
FIG. 1 is a top view showing an embodiment of a magnetic recording/playback apparatus of the invention, the case of the apparatus having been removed.
Figure 2:
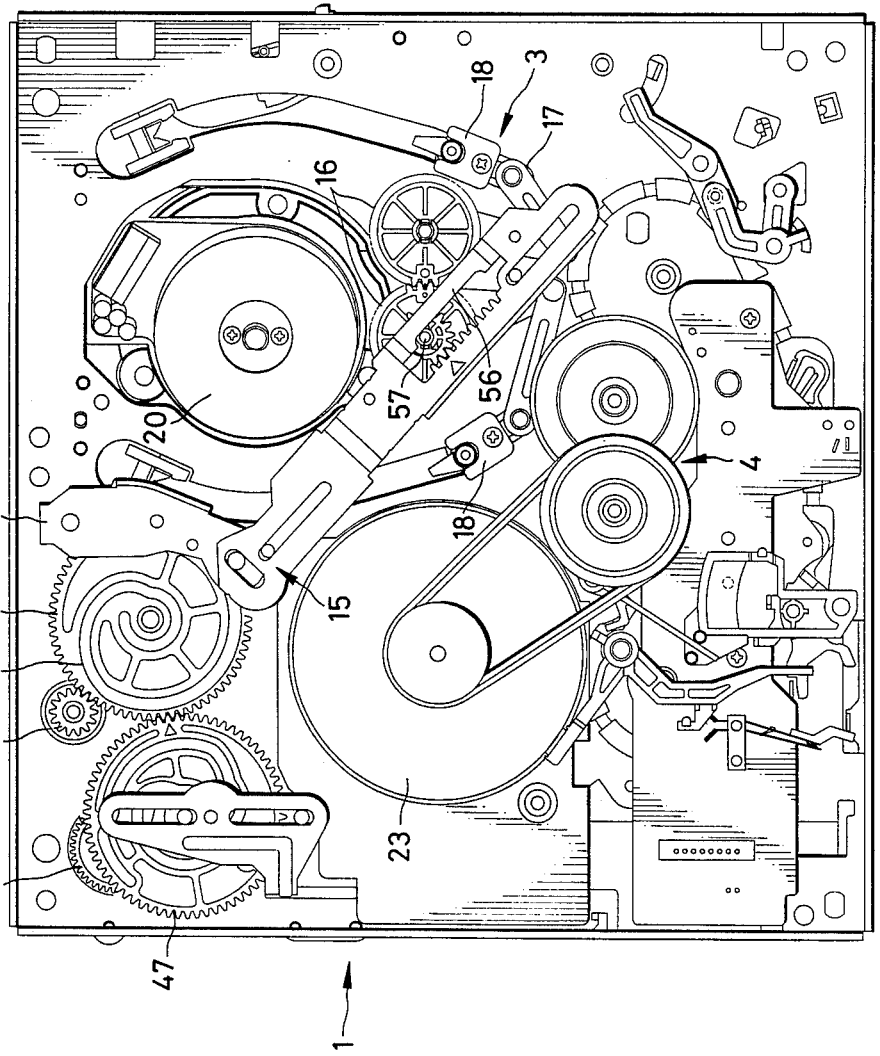
FIG. 2 is a bottom view of the same.

A magnetic recording/playback apparatus for household use is generally known as a video tape recorder and shall hereinafter be referred to as a "VTR". The VTR is illustrated in the accompanying drawings, in which FIG. 1 is a top view of the VTR mechanism with the case removed, and FIG. 2 is a bottom view thereof. The VTR, shown at numeral 1, includes a cassette loading mechanism 2 for loading and ejecting a tape cassette, a tape loading mechanism 3 for winding a tape on and unwinding it from a cylinder, and a tape feed mechanism 4 for feeding the tape.

The cassette loading mechanism 2 has a worm wheel 7 meshing with a worm 6 provided on the shaft of a drive motor 5 and rotatable by being directly coupled to the motor. The worm wheel 7 is coupled to a rack 9 via a pinion 8. The rack 9 is connected to a mechanism (see FIGS. 32 and 33) described below. A cassette is loaded on the chassis of the VTR when the rack 9 is moved upward in FIG. 1 and can be ejected when the rack 9 is moved downward The worm wheel 7 has a toothless portion 10. When the toothless portion 10 is situated opposite the worm 6, namely when there is no transfer of power from the worm 6 to the worm wheel 9, the tape loading mechanism 3 is operated and the rotational torque of the drive motor 5 is transmitted solely to the tape loading mechanism 3 via a pulley 11 and a reducing gear train 49.

Figure 32:
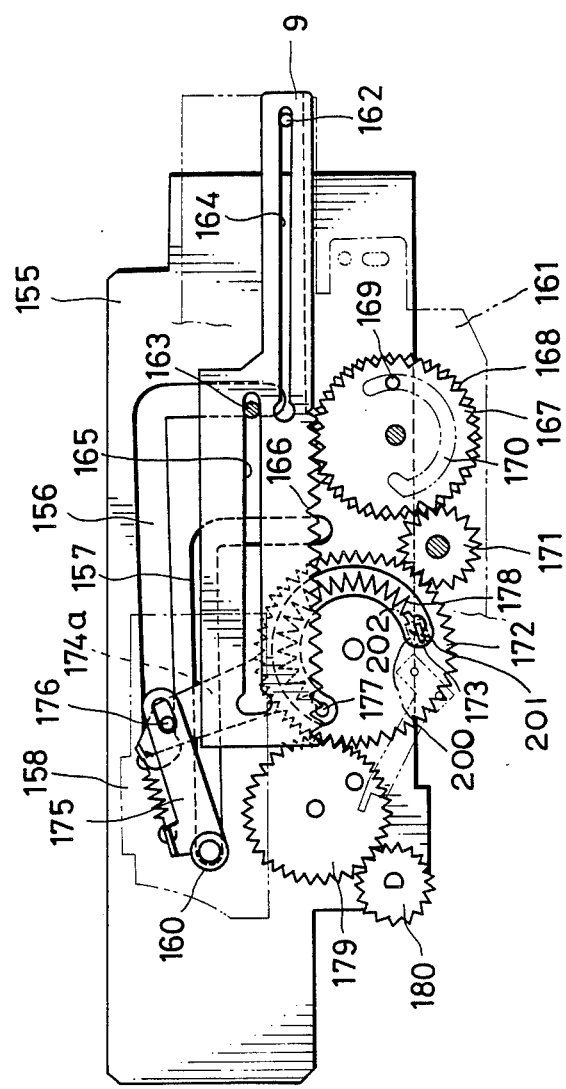
FIG. 32 is a side view of a cassette loading mechanism as seen from XXXII—XXXII in FIG. 1.
Figure 33:
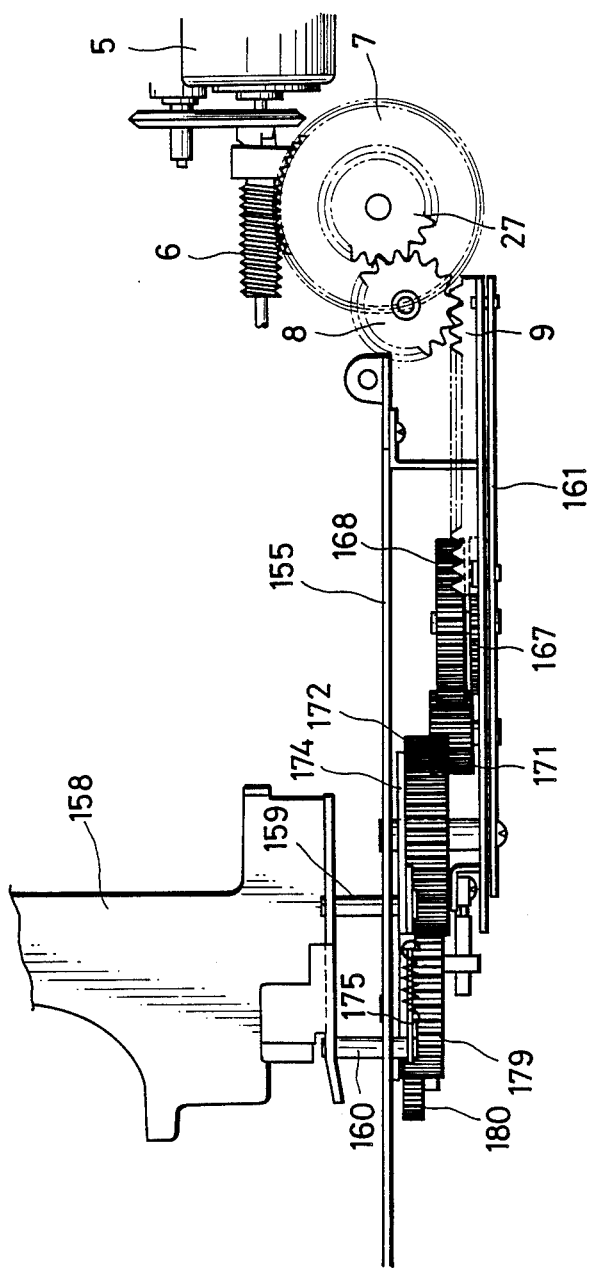
FIG. 33 is a plane view of the cassette loading mechanism.

The cassette loading mechanism employs the arrangement shown in FIGS. 32 and 33. A side plate 155 provided on both sides of the chassis is formed to have generally inverted L-shaped grooves 156, 157. A cassette holder 158 has a pair of spaced pins 159, 160 extending outwardly from the side thereof and passing through the grooves 156, 157. Thus, the arrangement is such that the cassette holder 158 moves in accordance with a path decided by the grooves 156, 157. A rack holder 161 is arranged in spaced relation to one side plate 155. Pins 162, 163 secured to the rack holder 161 are inserted into respective slots 164, 165 of rack 9 and serve to smoothen back-and-forth movement of the rack 9. The rack 9 has teeth 166 meshing with a first gear 167 freely rotatably supported on the holder 161. A second gear 168 is disposed in coaxial relation with the first gear 167 via a one-way clutch (not shown). A pin 169 is erected on the first gear 167 and is inserted into an arcuate groove 170 formed in the holder 161. When a cassette is loaded, the pin 169 enters one end of the groove 170 directed toward the center of the gear, thereby established a locked state. The second gear 168 is connected to a fourth gear 172 via a third gear 171.

The fourth gear 172 has an arcuate groove 173. A sector gear 174 is disposed in concentric relation to the gear 172 and has an arm 174a connected via a slot and a pin 176 to one end of a lever 175 pivotally supported by the pin 160. The gear 172 is provided with a through-hole 200 from which a protuberance 201 fixedly secured to the sector gear 174 projects. A protuberance 201 and a pin 177 fixedly secured to the gear 172 are connected by a spring 178. The spring 178 is inserted into the groove 173.

Owing to the biasing force of the spring 178, the sector gear 174 is urged in the counter-clockwise direction so that one end 202 of the through-hole 200 and the protuberance come into contact, thereby preventing turning of the sector gear 174. As a result, the gear 172 and sector gear 174 are capable of turning in unison. Rotation of the sector gear 174 is transmitted to the output gear 180 via an intermediate gear 179, and rotation of the output gear 180 is transmitted to the gears on the other side plate; hence, the gears on both side plates rotate in similar fashion. A similar cassette holder transfer mechanism is provided on the other side plate. The rotation of the fourth gear 172 is transmitted to the sector gear 174 via the protuberance 201, and rotation of the sector gear 174 turns the arm 174a, whereby the pin 160 is moved along the groove 157 via the lever 175. Movement of the pins 159, 160 produces movement along the grooves 156, 157 of the cassette holder 158. At the completion of cassette loading, it is possible for the cassette to be urged into its predetermined position on the chassis due to the biasing force of the spring 178.

When the cassette is inserted, the drive motor 5 advances the rack 9 to turn the gears 167, 168, 171 and 172. Clockwise rotation of the gear 172 is transmitted to the sector gear 174 via pin 177, so that the arm 174a is turned clockwise in such a manner that cassette holder 158 is moved to the rear. Eventually, the cassette holder 158 descends and the pin 169 enters the radially extending portion of the groove 170 at one end thereof to establish the locked state. The motor 5 is stopped at the same time. At this moment the cassette is pressed against the chassis. At such time the pin 177 moves in a direction away from one end of the groove 173. It should be noted that a reverse driving force from the fourth gear 172 is not transmitted to the rack 9 by a clutch between the gears 167, 168.

To eject the cassette, the rack 9 is advanced to rotate the gear 172 in the counter-clockwise direction, and the cassette holder 158 is returned to its original position by the biasing force of spring 178.

The rotational torque of the drive motor 5 is transmitted to a first cam gear 12 (see FIG. 2), which has a cam groove meshing with a small gear 143 (see FIGS. 4 through 13) via the motor pulley and belt, the pulley on the motor side, the pulley 11 which includes the pulley on the side of the worm 141, and the gear train 49 comprising a worm 141, which receives rotational torque from the pulley 11 that uses the belt, a worm wheel 142 meshing with the worm 141, and the small gear 143 which rotates together with the worm wheel 142 and is coaxial therewith. As a result, a follower 14 which follows a cam groove 13 is caused to rock, thereby reciprocating a rack 15. The movement of the rack 15 causes a gear 16 to rotate to spread a pair of links 17, whereby a tape pull-out body 18 is moved along a guide slot 19 formed in the chassis. The tape is wound up on a drum 20, and in a reverse operation, the tape is returned to the interior of the cassette.

The tape feed mechanism 4 has a capstan 22, a capstan motor 23, an idler mechanism 24, a supply reel table 25 (referred to as an "S-reel table"), and a take-up reel table 26 (referred to as a "T-reel table). When the T-reel table 26 is rotated, tape feed is performed in order to enable, e.g., magnetic recording playback. Rotation of the S-reel table 25 feeds the tape to enable, e.g., fast rewind of the tape.

The general features of the basic construction of the illustrated embodiment of the invention are as set forth above. A more detailed description will now be given.

Figure 3:
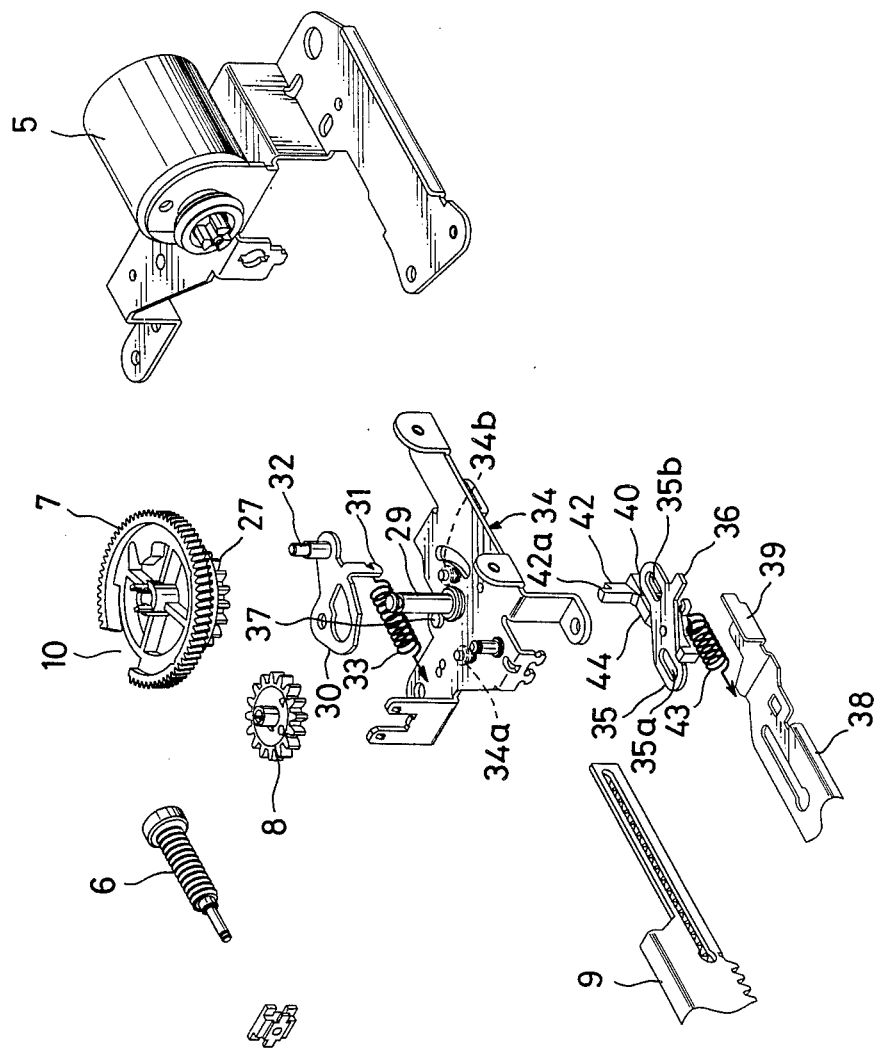
FIG. 3 is an exploded perspective view of a toothless worm wheel portion.

The components between the drive motor 5 and rack 9 that construct the cassette loading mechanism 2 are illustrated in FIG. 3. The worm wheel 7 has a flat gear 27 formed integral therewith, and a cam face 28 (see FIGS. 4 through 11) provided with a groove 45. The flat gear 27 integral with the worm gear 7 is coupled with the rack 9 via the pinion 8, the rack 9 being reciprocated in dependence upon the direction in which the worm wheel 7 rotates. A first slide plate 30, which is free to turn about a pin 37 relative to a shaft 29 freely rotatably supporting the worm wheel 7, has a downwardly directed protuberance 31 and an upwardly directed pin 32. A spring 33 has one end thereof fastened to the protuberance 31. The pin 32 is in sliding contact with the cam face 28, and the protuberance 31 opposes a transversely extending projection 36 of a second slide plate 35 that is freely slidable along the bottom side of a base 34 fixed to the chassis. The second slide plate 35 has a pair of oblong holes 35a, 35b through which are passed respective pins 34a, 34b implanted in the base 34. The holes 35a, 35b and pins 34a, 34b serve to guide the second slide plate 35 when the latter moves. The second slide plate 35 has a downwardly directed portion 40 opposing a projection 39 of a first control plate 38, and an upwardly directed portion 42 opposing a projection on the cam face 28, and freely pivotally supports a link 44 which receives the biasing force of a spring 43.

Figure 4:
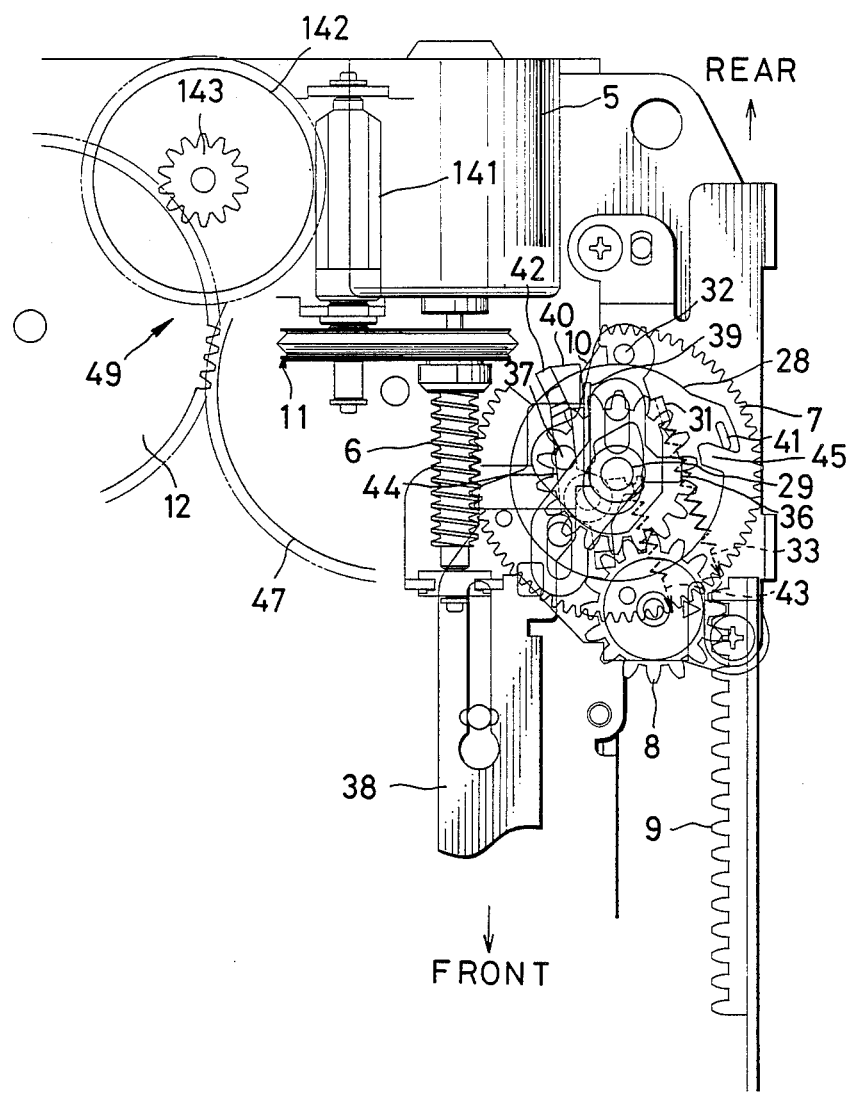
FIGS. 4 through 11 are plane views showing the correlation between a worm and worm wheel.
Figure 5:
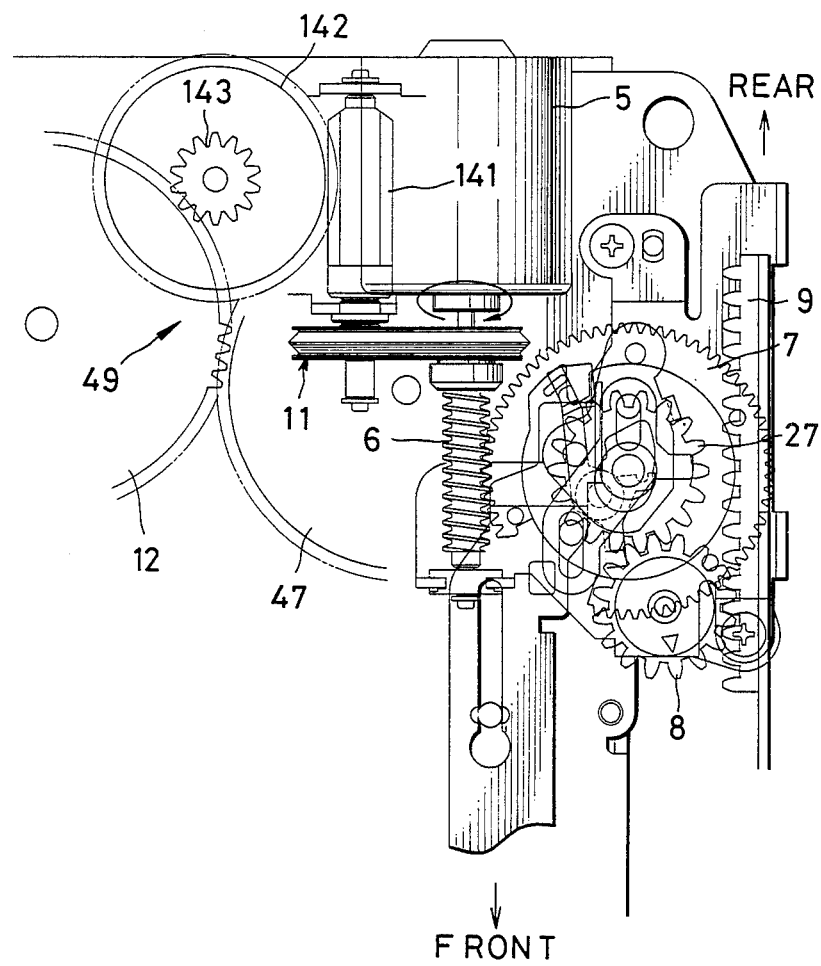
Figure 6:
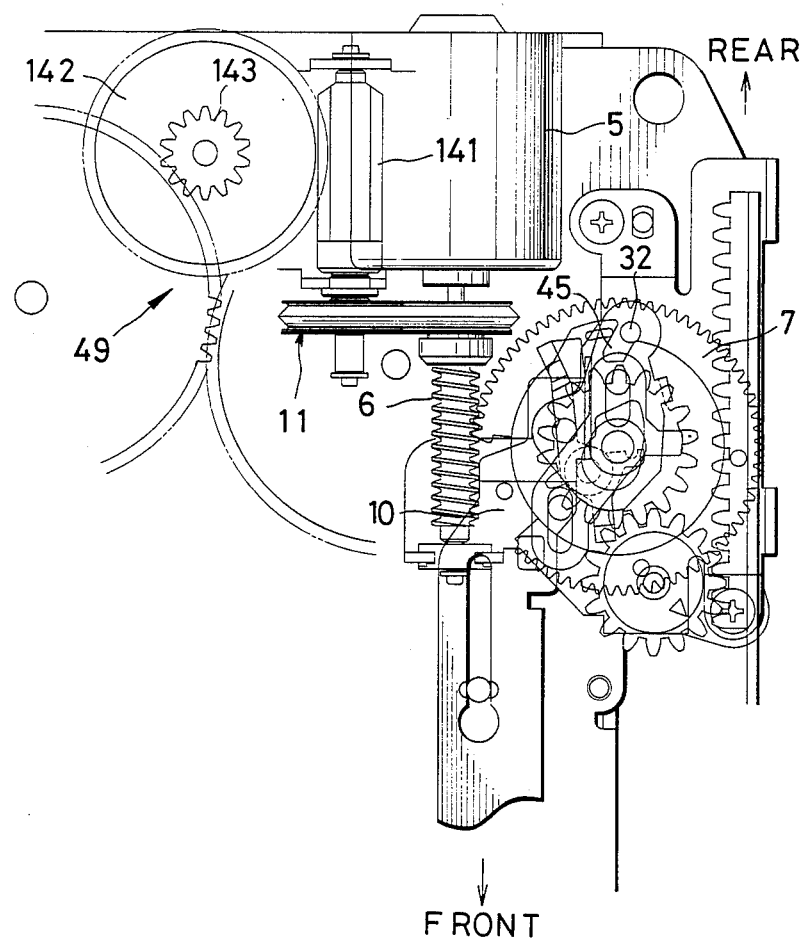
Figure 7:
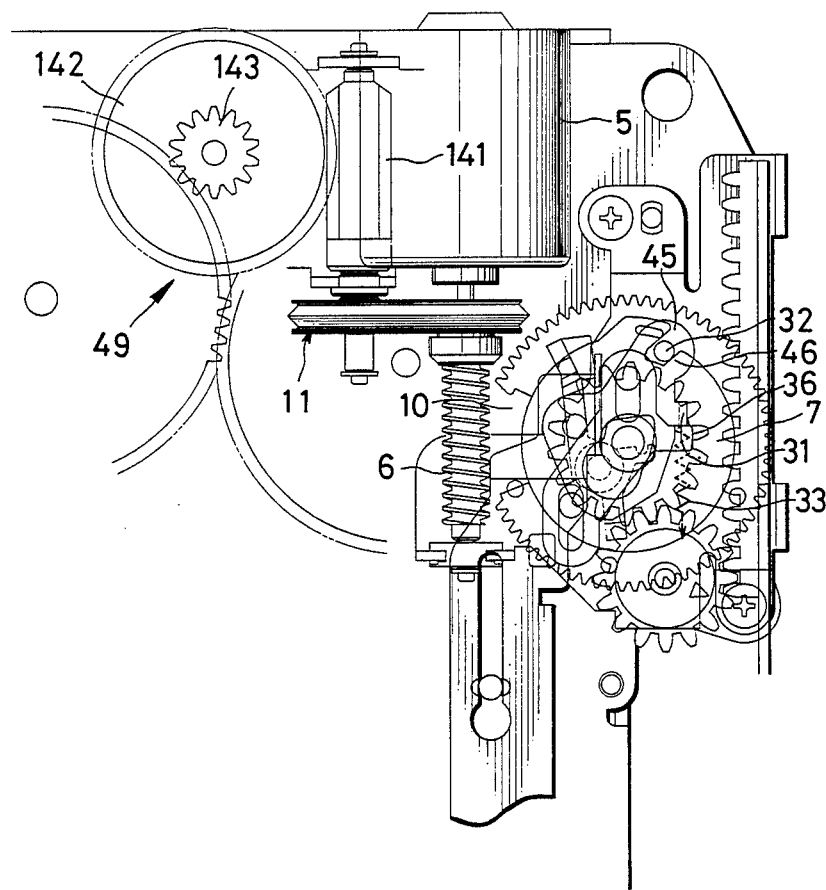

FIG. 4 shows the relationship among the above-described components when the cassette is in an ejected state. As shown, the worm 6 and worm wheel 7 are meshing near the toothless portion 10, the projection 39 of the first control plate 38 is in abutting contact with the downwardly directed portion 40 of the link 44, and the pin 32 is stopped at the position indicated. When the cassette is inserted to rotate the drive motor 5 in the direction of the arrow in FIG. 5, thereby causing the worm wheel 7 to rotate clockwise via the worm 6, the flat gear 27 and pinion 8 rotate to move the rack 9 toward the rear (see FIG. 5). The state shown in FIG. 5 is the same as that depicted in FIG. 4 except for rotation of the worm wheel 7. When the worm wheel 7 rotates further in the clockwise direction, the pin 32 eventually arrives directly in front of the groove 45 and the part of the worm wheel 7 directly in front of the toothless portion 10 is meshing with the worm 6. When the pin 32 enters the groove 45, as is shown in the transition from the state of FIG. 6 to the state of FIG. 7, the first slide plate 30 turns clockwise about the pin 37 while the pin 32 of the first slide plate 30 pushes an inclined face 46 of groove 45 owing to the force of spring 33. As a result, the worm wheel 7 is forcibly rotated in the clockwise direction to follow up motion of the first slide plate 30, so that the toothless portion 10 is brought into position opposite the worm 6, thereby unmeshing the worm 6 and the worm wheel 7 and eliminating the torque transfer between the two. The protuberance on the first slide plate 30 comes into abutting contact with the projection 36 of the second slide plate 35. Under these conditions, the cassette is received at its predetermined position. When cassette loading is completed, this is followed by the start of the tape loading operation.

Figure 8:
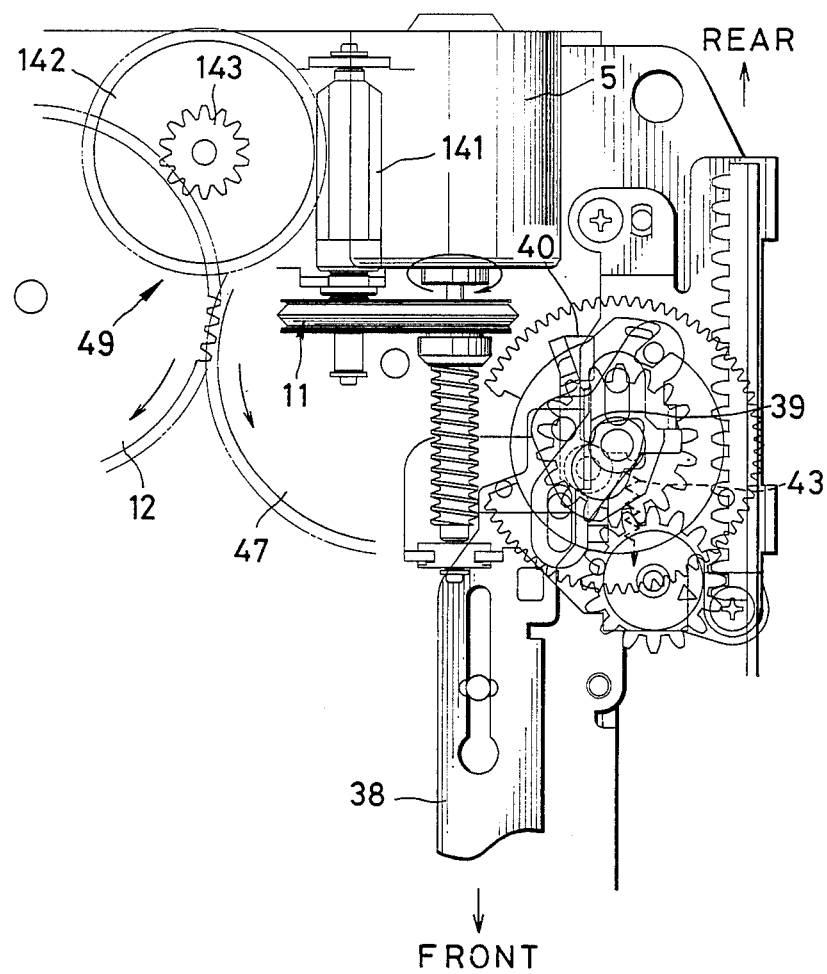

FIG. 8 illustrates the state at the beginning of tape loading. The first cam gear 12 and second cam gear 47 are rotated by the drive motor 5 acting through the pulley 11 and reduction gear train 49. A fourth cam groove 89 of the second cam gear 47 moves the control plate 38 in the forward direction. Consequently, the projection 39 of the first control plate 38 and the downwardly directed portion of the link 44 are taken out of contact and the link 44 is turned clockwise by the spring 43. The aft end of the projection 39 is brought into position opposite the front end of the downwardly direction portion 40. This state is maintained when the tape is fed.

Figure 9:
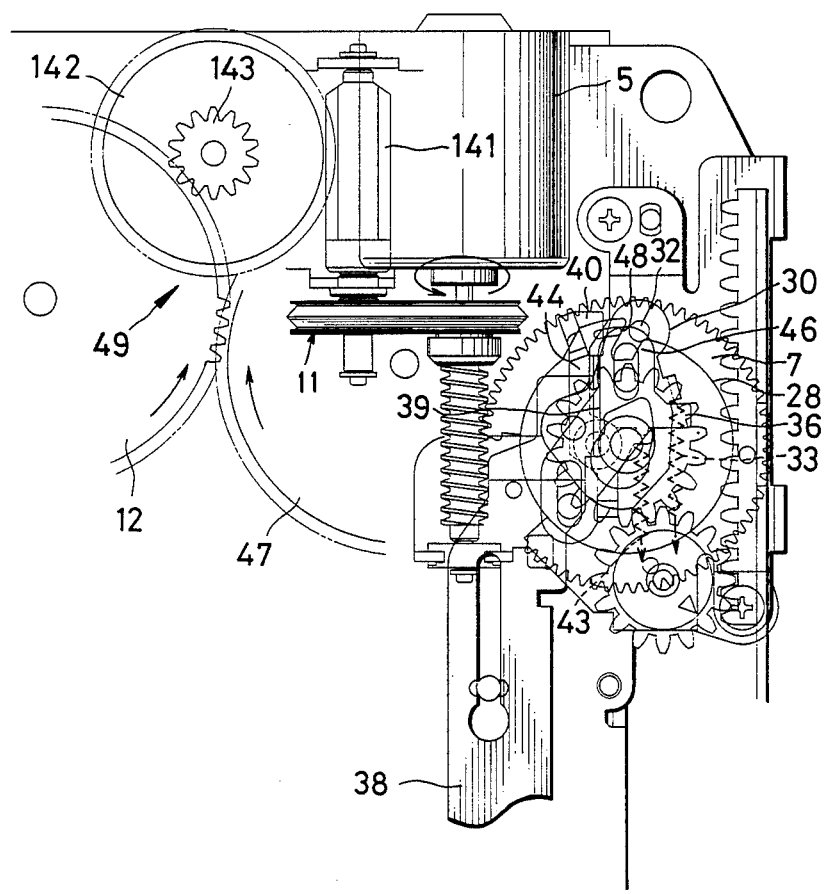
Figure 10:
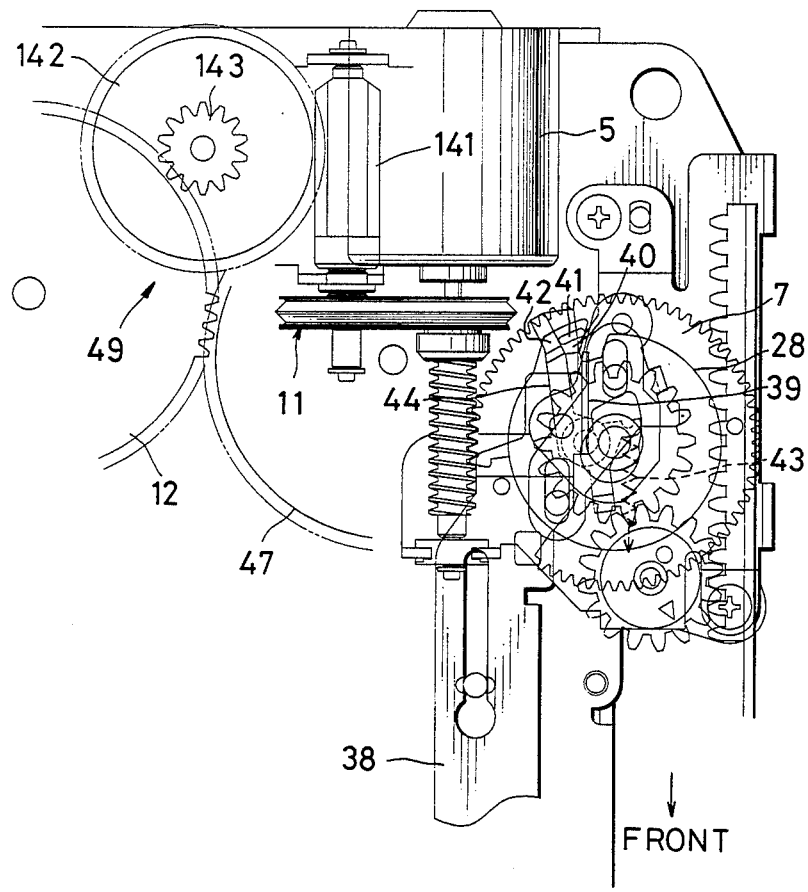
Figure 11:
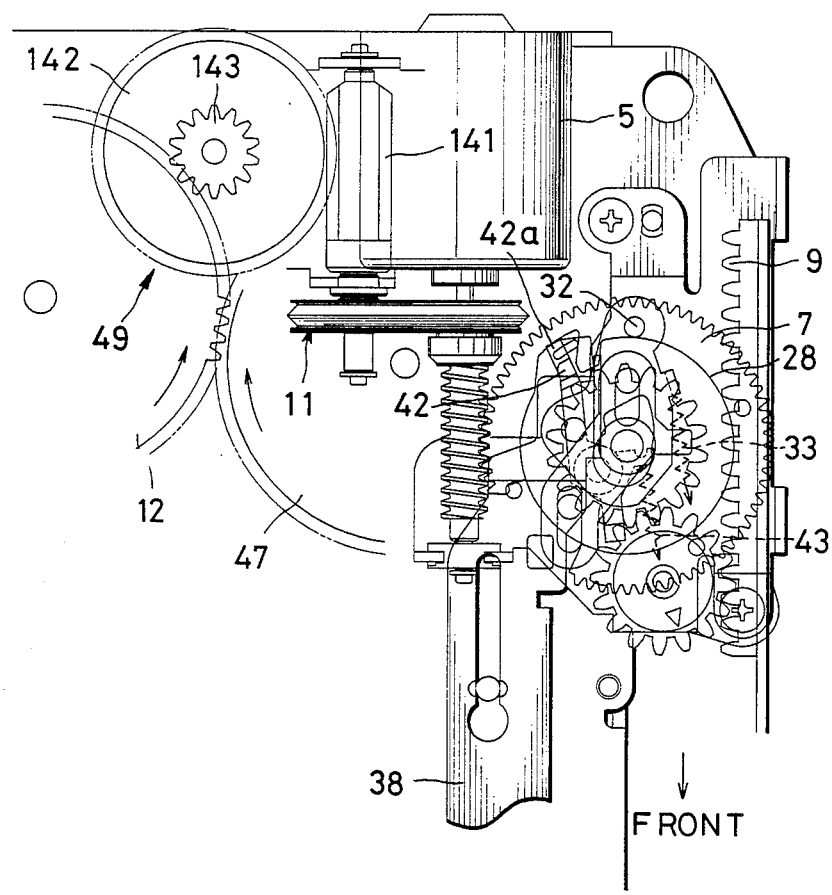

In response to a cassette ejection signal from a system controller, the drive motor 5 is reversed to rotate the first and second cam gears 12, 47 in the direction opposite that in which they rotated in FIG. 8. Refer to FIG. 9. The first control plate 38 is moved toward the rear by cam groove 89 of the second cam gear 47. In consequence, the aft end of the projection 39 engages the downwardly directed portion 40 of link 44 and then moves the link 44 toward the rear. Owing to the rearward motion of the link 44, the downwardly directed protuberance 31 of the first slide plate 30 is urged toward the rear by the projection 36, and the first slide plate 30 is rotated counter-clockwise about the protuberance 37 against the biasing force of spring 33 and is slid toward the rear. At such time the pin 32 of the first slide plate 30 pushes an inclined surface 48 of groove 45 to forcibly turn the worm wheel 7 counter-clockwise so that one tooth on the worm wheel 7 and one tooth on the worm 6 mesh, as a result of which the worm wheel 7 is rotated by the worm 6. Owing to this rotation of worm wheel 7, the pin 32 is forced out of the groove 45 by the inclined surface 46 thereof, and the pin moves along the cam face 28. Owing to turning of the worm wheel 7 in the counter-clockwise direction, the projection 41 of cam face 28 abuts against the right-hand part of the upwardly directed portion 42 of link 44 so that the latter is turned counter-clockwise against the biasing force of spring 43. At this time the aft end of projection 39 of the first control plate 38 and the front end of the downwardly direction portion 40 of link 44 disengage and the link 44 is moved toward the front by the biasing force of spring 43. As a result, as shown in FIG.

11, the projection 41 on cam face 28 is capable of passing through a cut-out 42a at the back of the upwardly direction portion 42 of link 44 and the worm wheel 7 is rotated in the counter-clockwise direction. The rack 9 is moved forward to eject the cassette. When the state shown in FIG. 4 is attained, a leaf switch (not shown) is actuated to produce a signal. Rotation of the drive motor 5 is stopped in response to detection of this signal.

As will be apparent from the foregoing, cassette loading and ejection is performed when the worm 6 and worm wheel 7 are meshing with each other, and the tape loading operation is performed when the toothless portion 10 of the worm wheel 7 is positioned opposite the worm 6 to interrupt the transmission of torque from the worm to the worm wheel. Accordingly, two operations are possible with one drive motor. In addition, if the cassette should become stuck during cassette loading, for example, the worm stops rotating and there is no transfer of rotational torque to the tape loading mechanism. Therefore, operation of the tape loading mechanism will not precede operation of the cassette loading mechanism and will not fail to be synchronized with operation of the cassette loading operation. It should be noted that during cassette loading, followers of respective first through fourth cam shafts, described below, move portions having equal diameters.

Figure 12:
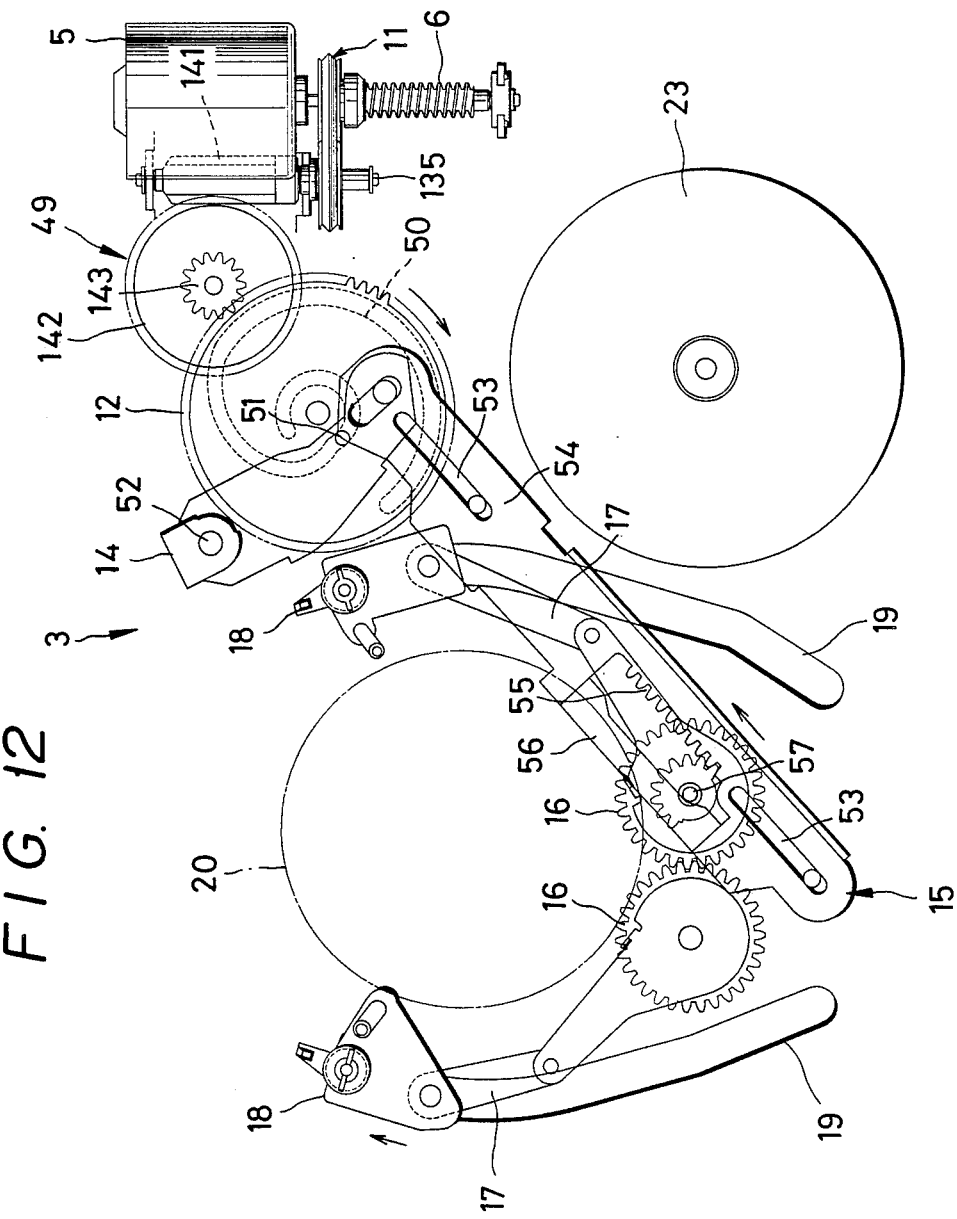
FIG. 12 is a plane view showing a tape loading mechanism.

The tape loading operation will now be described with reference to FIG. 12. Rotational torque from the drive motor 5 is transmitted to the first cam gear 12 via the pulley 11 and reducing gear train 49. The bottom side of the cam gear 12 is provided with a second cam groove 50, while a follower having a pin 51 inserted into the cam groove 50 is retained on the chassis so as to rock freely about a fulcrum 52. A rack 15 is supported on the distal end of the follower 14 via a slot and pin. The rack 15 has slots 53, 53 at both sides thereof for receiving respective pins secured to the chassis. As a result, in dependence upon rotation of the first cam gear 12, the position of the pin 51 in the cam groove 50 changes and the follower 14 is turned about the pin 52 to reciprocate the rack 15. In the illustrated embodiment, the state shown is one in which the first cam gear 12 has been rotated in the direction of the arrow to move the rack 15 in the direction of the arrow.

The rack 15 is an elongated, slender plate 54 the lower part of the central portion whereof has an oblong hole one edge of which is cut to have teeth 55, the other edge 56 of which has a difference in level relative to the teeth 55. The shaft 57 of a small gear meshing with the teeth 55 moves along the edge 56. In consequence, during reciprocation of the rack 15, the rack 15 is guided at three points of sliding contact, namely at the slots 53, 53 which receive the pins fixed to the chassis, and between the edge 56 where it contacts the shaft 57 located between the slots. Thus, the rack 15 is kept on a fixed path and is prevented from curving.

The movement of the rack 15 causes gears 16, 16 to rotate. Each gear 16 has one of a pair of links 17 fixedly secured thereto, an intermediate link is pivoted on the fixed link, and the tape pull-out body 18 is pivotally supported on the intermediate link. The tape pull-out bodies 18, 18 have their movement limited by respective guide holes 19, 19 formed in the chassis. In the illustrated embodiment, the rack 15 is being moved toward the rear in the direction of the arrow. In this case, the gears 16, 16 cause the links 17, 17 to spread apart so that the tape pull-out bodies 18, 18 are moved backward along the guide holes 19, 19, thereby pulling the tape (not shown) from the cassette and bringing it into contact with the surface of the drum 20. The tape pull-out bodies 18 eventually come into abutting contact with stoppers at the ends of the guide holes 19, 19. At this time the pin 51 inserted in the second cam groove 50 is guided so as to be drawn inward from the outer periphery of the cam groove 50, so that the tape pull-out bodies 18 are brought into reliable and strong contact with the drum in such a manner that the tape is wound upon the drum 20 over a predetermined angle despite the small load upon the motor 5. It should be noted that when the tape is returned to the cassette, the cam gear 12 and rack 15 are operated in directions opposite those indicated by the arrows in FIG. 12 to move the tape pull-out bodies 18 forward. Such motion is predetermined by the cam groove 50.

Figure 13:
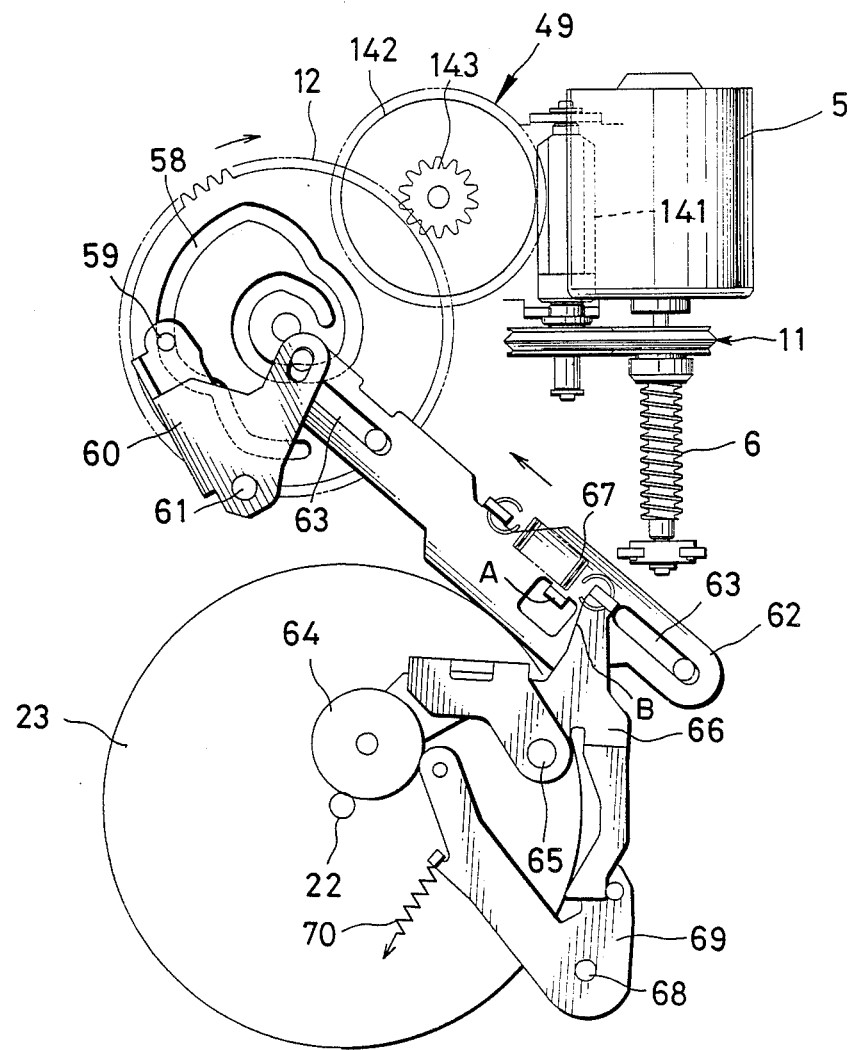
FIG. 13 is a plane view illustrating a mechanism for bringing a pinch roller into pressured contact with a capstan.

Next, the manner in which a pinch roller is pressed against the capstan 22 will be described with reference to FIG. 13. The surface of the first cam gear 12 is provided with a first cam groove 58. A follower 60 having a pin 59 inserted in the cam groove 58 is arranged on the chassis so as to be freely turnable about a pin 61. An end portion of a slide plate 62 is pivotally supported via a slot and pin on one end of the bell crank-shaped follower 60. Both sides of the slide plate 62 are provided with slots 63, 63 which receive pins on the chassis. Thus the slide plate 62 is capable of moving linearly under the guidance of these pins. A pinch roller arm 66, one end of which has a pinch roller 64 and which is free to turn about a pin 65, is connected to the slide plate 62 via a spring 67. The spring 67 causes the pinch roller arm 66 to turn counter-clockwise about the pin 65 along with the motion of the slide plate 62. One end of a tape guide arm 69, which is free to turn about a pin 65, is fastened to the pinch roller arm 66, and the end thereof is fastened to a spring 70. When the first cam gear 12 is turned in the direction of the arrow by the motor 5, the follower 60 turns counter-clockwise (FIG. 13 shows the follower 60 in the turned state) owing to the cam groove 58, so that the slide plate 62 is moved in the direction of the arrow. As a result, the spring 67 causes the pinch roller arm 66 to turn counter-clockwise about the pin 65 so that the pinch roller 64 is brought into pressured contact with the capstan 22 and the tape guide arm 69 is turned clockwise. When the motor 5 is rotated in the reverse direction, the first cam gear 12 and slide plate 62 move in directions opposite those of the arrows and the pinch roller 64 is turned clockwise so as to part from the capstan 22. A tab A on the slide plate 62 urges an edge B of the pinch roller arm 66 to turn the arm 66 in the clockwise direction.

Figure 14:
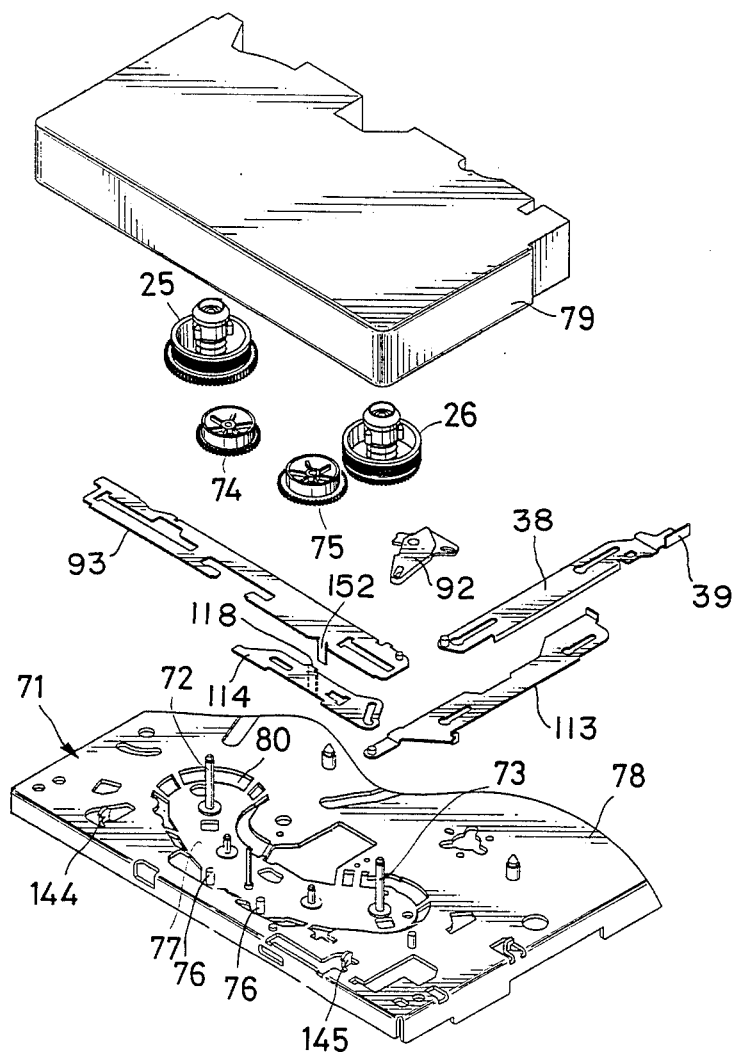
FIG. 14 is a perspective view showing part of a chassis having a recess.

The features of a chassis 71 used in an embodiment of the invention will now be described with reference to FIGS. 14 and 15. A surface 77 of the chassis 71 includes the S-reel table 25, the T-reel table 26, shafts 72, 73 for these reel tables, intermediate gears 74, 75 meshing with the respective reel tables 25, 26, and brake shafts 76, 77, described below. The surface 77 is formed to be lower than a main surface 78 of the chassis, thereby defining a depression. As a result, the bottom surface of a cassette 79 can be brought into close proximity to the main surface 78 of the chassis 71 to make possible a reduction in the thickness of the VTR. The depression 77 is formed by providing the chassis 71 with a plurality of cut-outs and subjecting the portion 77 to downward pressing or drawing. If the chassis 71 were not provided with the depression 77, the bottom surface of the cassette 79 would be raised in height by the difference in level between the depression 77 and main surface 78, and this would make it necessary to heighten the capstan by this difference in level, resulting in a correspondingly thicker VTR. In accordance with the illustrated embodiment of the invention, however, the reel tables 25, 26 are seated on the lower-level surface of the chassis 71 to make possible a thinner VTR.

Figure 15:
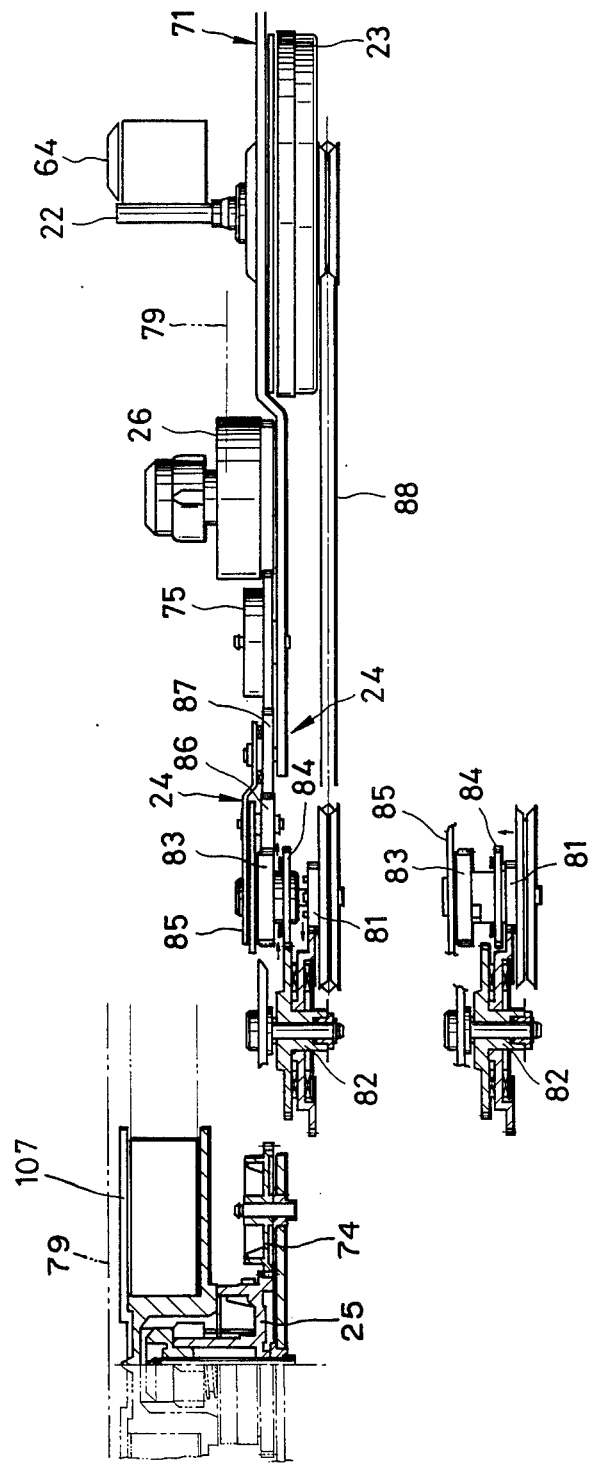
FIG. 15 is a side view showing a tape feed mechanism.

Further, as evident from FIG. 15, a band brake 107 is disposed between the lower surface of the cassette 79 and the main surface of the chassis 78, and main brakes 119, 120 act upon cylindrical portions of the intermediate gears 74, 75 disposed in the depression 77. This makes possible a reduction in the thickness of the VTR despite use of the band brake 107 and main brakes 119, 120.

Means for transmitting torque from the capstan motor 23 to the reel tables 25, 26 will be described with reference to FIG. 15. Torque from the output shaft of the capstan motor 23 is transmitted to a main gear 81 via a belt 88. The main gear 81 is meshed with a speed reducing bypass gear 82 equipped with a slip mechanism. The bypass gear 82 has an output gear meshed at all times with an input gear 84 of a follower gear 83 having a clutch mechanism. However, since the main gear 81, input gear 84 and follower gear 83 are supported on the same shaft, the rotation of the main gear 81 is transmitted directly to the follower gear 83 when the input gear 84 is slid toward the main gear 81 to unmesh the input gear 84 and the output gear of the bypass gear 82 having the slip mechanism and mesh the input gear 84 with the main gear 81. A pair of idle gears 86, 87 are axially supported on a carrier 85 supported on the chassis 71 so as to be freely turnable. One of these gears, namely gear 86, is meshed with the follower gear 83 to construct an idler 24. The other idle gear 87 is capable of being meshed with the intermediate gear 74 or 75.

In FIG. 15, the state shown is one in which the tape is being fed as for the purpose of playing back a magnetic recording. Rotational torque from the capstan motor 23 rotates the main gear 81, whereby the intermediate gear 75 and T-reel table 26 are caused to rotate via the bypass gear 82, input gear 84, follower gear 83 and idle gears 86, 87. The slip mechanism of the bypass gear 82 regulates the upper limit of the rotational torque applied to the reel tables 25, 26 and limits the action of high torque. When the T-reel table 26 is rotated at high speed, the input gear 84 is slid on its shaft, the input gear 84 and bypass gear 82 are unmeshed and the input gear 84 is meshed with the main gear 81. As a result, the rotation of main gear 81 is transmitted directly to the follower gear 83.

When it is necessary to rotate the S-reel table 25 as when taking up tape, the capstan 23 is rotated in the reverse direction. Though the reverse rotational torque attempts to rotate the follower gear 83 and idle gear 86 is the reverse direction, the torque acts in a direction which separates the other idle gear 87 from the intermediate gear 75. Therefore, the carrier 85 turns about the idle gear 86 while the idle gear 87 is carried. The other idle gear 87 is meshed with the intermediate gear 75 on the side of the S-reel table 25. Owing to the slip mechanism within the idler mechanism, the reverse rotational torque urges the idle gear 87 against the intermediate gear 74, so that the intermediate gear 74 and S-reel table 25 rotate. When the S-reel table 25 is rotated quickly, the clutch operates and the input gear 84 is meshed with the main gear 81, so that the rotational torque from the capstan motor 23 is transmitted directly to the follower gear 83 without the intermediary of the speed reducing bypass gear 82.

With this tape drive system for winding the tape at least a portion of the peripheral surface of drum 20, the load produced by winding the tape, which is traveling at a constant speed, on the drum 20 is received by the pinch roller 64, capstan 22 and T-side reel table 26 during forward rotation. At reverse rotation, however, the load is received solely by the S-reel table 25 and therefore the take-up torque of the reel tables 25, 26 is larger at reverse direction than at forward rotation. In the present embodiment, the reel table limit torque assumes different values on the on the forward- and reverse-rotation sides, so that the speed reduction ratios from the capstan motor 23 to the reel tables 25, 26 differ. In other words, the gear diameter of the T-reel table 26 is made smaller than that of the S-reel table 25 to increase the take-up torque on the side of the S-reel table 25. In this case, the rotational speed of the T-side reel table 26 is larger than that of the S-side reel table 25 with respect to the fixed rotational speed of the idling gear 86 when the tape is traveling at high speed for rewind (REW) and fast-forward (FF), as in the case of direct coupling without using the bypass gear 82 having the slip mechanism. Consequently, since a relation (REWIND TIME)<(FAST-FORWARD TIME) is established with regard to a predetermined amount of tape, the driving force of the capstan motor 23 is raised only for rewinding, and the relation (REWIND TIME)=(FAST-FORWARD TIME) is established, when the tape is traveling at high speed. When the bypass gear 82 is used, as for review or playback at when the tape is traveling at constant speed, the relation (REVIEW TORQUE)>(PLAYBACK TORQUE) is established so that the original object can be attained. Since raising the rotational speed of the capstan motor 23 can be performed with ease by system control, take-up torque (namely torque when the tape is traveling at constant speed) at reverse rotation can be enlarged without increasing the number of component parts.

The second cam gear 47 is in mesh with the first cam gear 12. Operation of the second cam gear 47 will be described with reference to FIGS. 16 and 17. The bottom side of the second cam gear 47 has a fourth cam groove 89. Connected to the first control plate 38 is a projection 92 of a follower plate 91 having a pin 90 serving as a follower inserted in the cam groove 89. The follower plate 91 has a pair of slots which receive the support shaft of the second gear cam 47, which is fixed to the chassis, and a pin spaced away from the support shaft. Reciprocating motion of the follower plate 91 is limited by these slots. The first control plate 38 is connected to a second control plate 93 via a connecting plate 92. The connecting plate 92 contacts one end of a T-side soft brake 94 and controls the manner in which the T-reel table 26 is contacted by the S-side soft brake 94, which receives the biasing force of a spring 95. An S-side soft brake 98, which has a pin 96 inserted in a cam hole 93a at the left end of the second control plate 93 and turns freely about a fulcrum 97, attempts to contact the S-reel table 25 under the biasing force of a spring 99. When the pin 96 is inserted in the cam hole 93a, the S-side soft brake 98 turns clockwise and separates from the S-reel table 25 to remove the braking force.

A tape tension lever 21 attempts to turn counterclockwise about a fulcrum 100 owing to a spring 101, but one end of a lever 103 which rock freely about a pin 102 limits this turning motion. The other end of the lever 103 is connected to a bell crank 104, to one end of which is secured a pin 105 that is free to abut against a cam face 106 on the side edge of the second control plate 93. One end of a band 107 wound on substantially half the circumference of the S-reel table 25 is attached to the tension lever 21 so as to be capable of turning freely. When the second control plate 93 moves leftward from the position shown in FIG. 16 so that the pin 105 arrives at a position opposing the cam face 106, turning motion due to the bell crank 104 and the biasing force of the spring 101 of lever 103 is allowed, so that the bell crank 104 turns counter-clockwise and the lever 103 turns clockwise about the pin 102 to move the pin 105 inward along the cam face. As a result, the tape tension lever 21 is capable of turning counter-clockwise about the fulcrum 100 due to the biasing force of the spring 101 so that a pawl at the end of the lever 21 is brought into pressured contact with the tape and the band 107 is wound up on the S-reel table 25 to apply back tension to the tape.

The surface of the second cam gear 47 is provided with a third cam groove 108. Inserted in the cam groove 108 is a pin 110 supported, so as to be freely reciprocatable up and down, on a slide plate 109 whose path of reciprocating motion is limited by a combination of spaces slots and pins. Owing to the cam groove 108, a portion of the slide plate 109 reciprocatable to the left and right in FIGS. 16 and 17 abuts against a link 112 that is free to turn about a fulcrum 111, so that a portion of the link 112 is abutted against the aft end of a third control plate 113 supported on the chassis so as to reciprocate freely. The front end of the third control plate 113 is connected to a transversely extending fourth control plate 114 via a slot and pin. The fourth control plate 114 is reciprocated freely on the chassis by use of a slot and pin.

A capstan brake 115 is constantly biased by a spring 116 counter-clockwise about a fulcrum 117 and attempts to contact the peripheral surface of the capstan motor 23. Accordingly, when a projection 118 on the fourth control plate 114 is moved to the left to turn the capstan brake 115 clockwise about the fulcrum 117, a braking force is removed from the capstan motor 23. When the fourth control plate 114 is moved to the right, the projection 118 is parted from the capstan brake 115 and the biasing force of the spring 116 causes the capstan brake 115 to abut against the capstan motor 23, thereby establishing a braking state.

Figure 17:
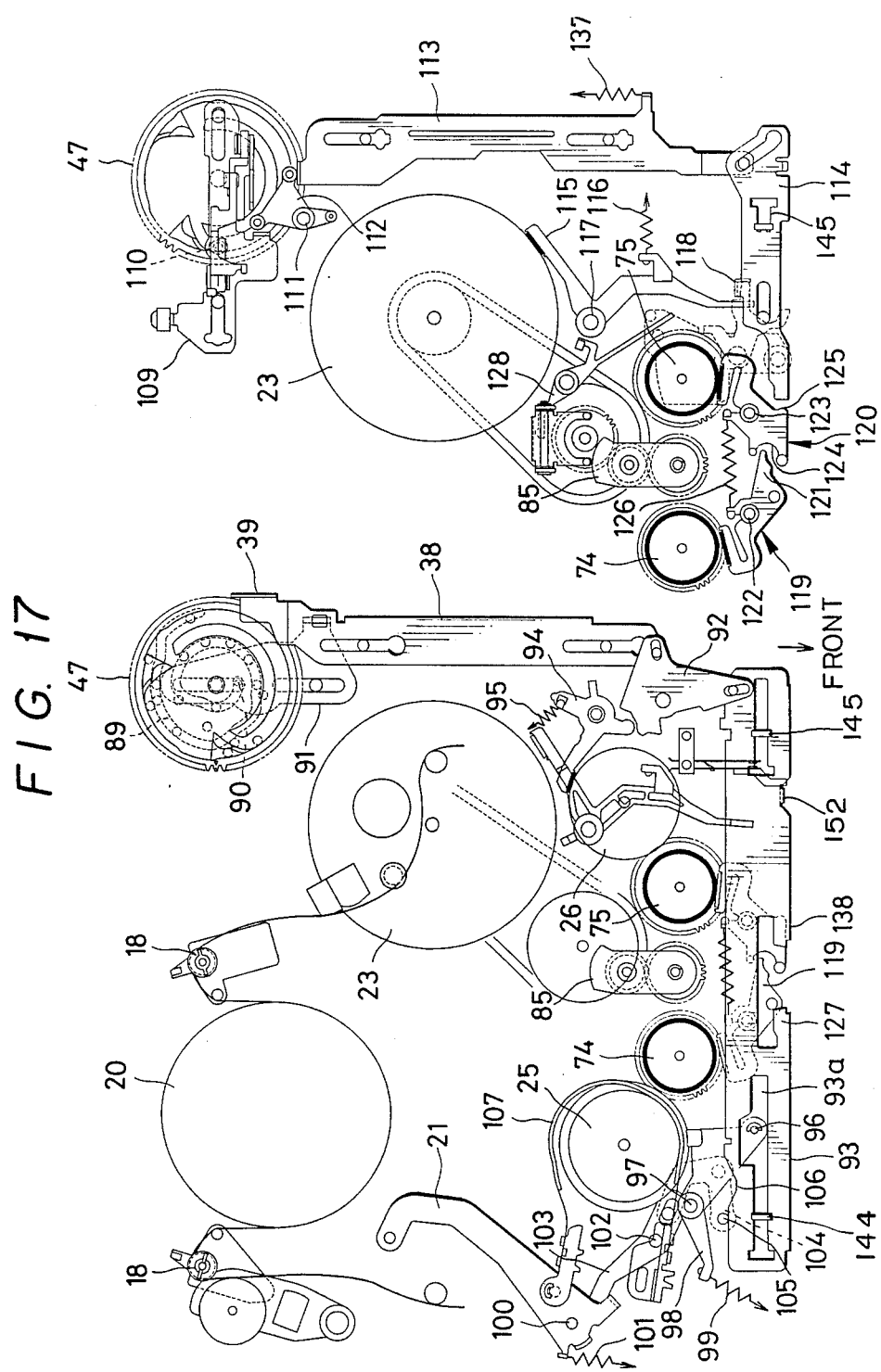

The intermediate gear 74 which rotates the S-reel table 25 and the intermediate gear 75 which rotates the T-reel table 26 are provided respectively with an S-side main brake 119 and a T-side main brake 120 for applying braking forces. The S-side main brake 119 is free to turn about a pin 122 and has a portion contactable with the intermediate gear 74 and a tip portion 121 located on its front end. The T-side main brake 120 is free to turn about 123 and has a portion contactable with the intermediate gear 75, an arcuate portion 124 on its from side for receiving the tip portion 121, and a portion 125 with which the left end of the fourth control plate 114 is capable of being contacted. The two main brakes 119, 120 are connected by a spring 126 and are adapted so as to contact the two intermediate gears 74, 75 and subject them to braking forces. When the fourth control plate 114 is moved leftward by the cam groove 108 via a link 111 and the third control plate 113, the left end pushes the portion 125 of the T-side main brake 120 to turn the brake 120 in the clockwise direction and remove the braking force from the intermediate gear 75. Also, one end of the arcuate portion 124 pushes upward the tip portion 121 of S-side main brake 119, thereby turning the S-side main brake 119 counter-clockwise against the biasing force of spring 126 and removing the braking force from the intermediate gear 74. When the control plate 114 is taken out of contact with the portion 125 of brake 120 at its left end, the two main brakes 119, 120 are brought into contact with the respective intermediate gears 74, 75 by the spring 126. It should be noted that when a piece 127 of the second control plate 93 thrusts a portion of the S-side main brake 119 rightward and the tip portion 121 of brake 119 moves idly in the arcuate portion 124 of the T-side main brake 120, as shown in FIG. 17, only the S-side brake 119 can be placed in the released state. Numeral 128 denotes a clutch actuator which operates in a manner described below.

Figure 18:
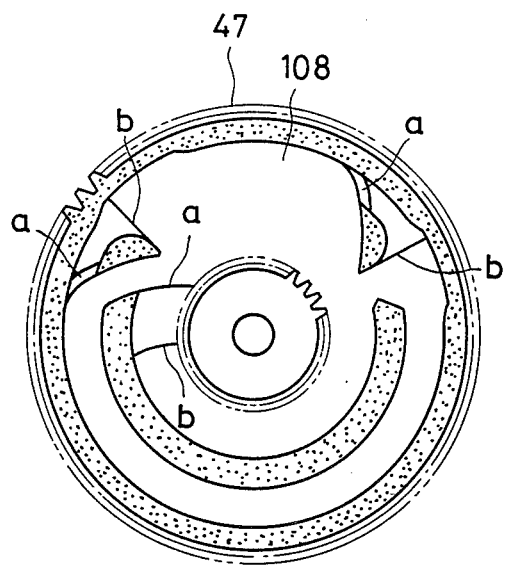
FIG. 18 is a plane view of a third cam groove.

As described above, the third cam groove 108 plays a major role in the operation of each of the brakes. As shown in FIG. 18, the cam groove 108 comprises raises portions indicated by the dots and portions which slant downwardly from a to b. The portion free of dot marks forms a groove surface with which pin 110 is in sliding contact. The motion of pin 110 along the groove surface of cam groove 108 causes reciprocation of the slide plate 109, which is constantly biased leftward in FIG. 19 by a spring 133. That this motion operates the two control plates 113, 114 via the link 112 has already been described. This slide plate 109, which comprises a metal plate, has a synthetic resin ratchet 130 which turns freely about a pin 129 provided on the slide plate 109. The ratchet 130 is capable of being lifted by a pin 110 which contacts the third cam groove 108. A portion of a separate ratchet 131 supported so as to turn freely on the side of the slide plate 109 is free to abut against the distal end of the ratchet 130, and both ratchets 130, 131 are connected by a spring 132. The spring 132 turns the ratchet 131 in the counter-clockwise direction. Consequently, the other ratchet 131 is not constantly in abutting contact with the ratchet 130. The slide plate 109 is biased leftward by the spring 133.

The ratchet 130 has downwardly directed braking plate 134 formed to have a tapered surface. When the slide plate 109 is moved rightward from the state shown in FIG. 19 by the third cam groove 108 and pin 110, the tapered surface of the braking plate 134 rides up on a rotary shaft 135 rotated by the pulley 11 to establish the state shown in FIG. 23. When the rotary shaft 135 is rotating clockwise, a braking force is applied to the rotary shaft 135. If the rotary shaft 135 is rotated counter-clockwise, on the other hand, the braking plate 134 jumps up to terminate the braking relationship between the braking plate 134 and rotary shaft 135.

Finally, the operation of the clutch actuator 128 will be described. As already set forth, the clutch directly couples the rotation of capstan motor 23 to the reel-table side or inputs this rotation to the bypass gear 82. See FIGS. 29(A) and 29(B). A main lever 144 is free to turn about a pin 145 provided on the chassis. The main lever 144 slidingly receives one end of a resilient, elongated member 128a of the actuator 128. A separate auxiliary lever 146 is freely turnably supported on a pin 147 at the side of the main main lever 144. The auxiliary lever 146 is connected to the main lever 144 by a spring 148 and has a finger 149 in abutting contact with the side wall of the main lever 144. The auxiliary lever 146 further includes a fork portion having one leg 150 which opposes a projection 118 of the fourth control plate 114 and a leg 151 opposing a projection 152 on the second control plate 93.

Figure 29A:
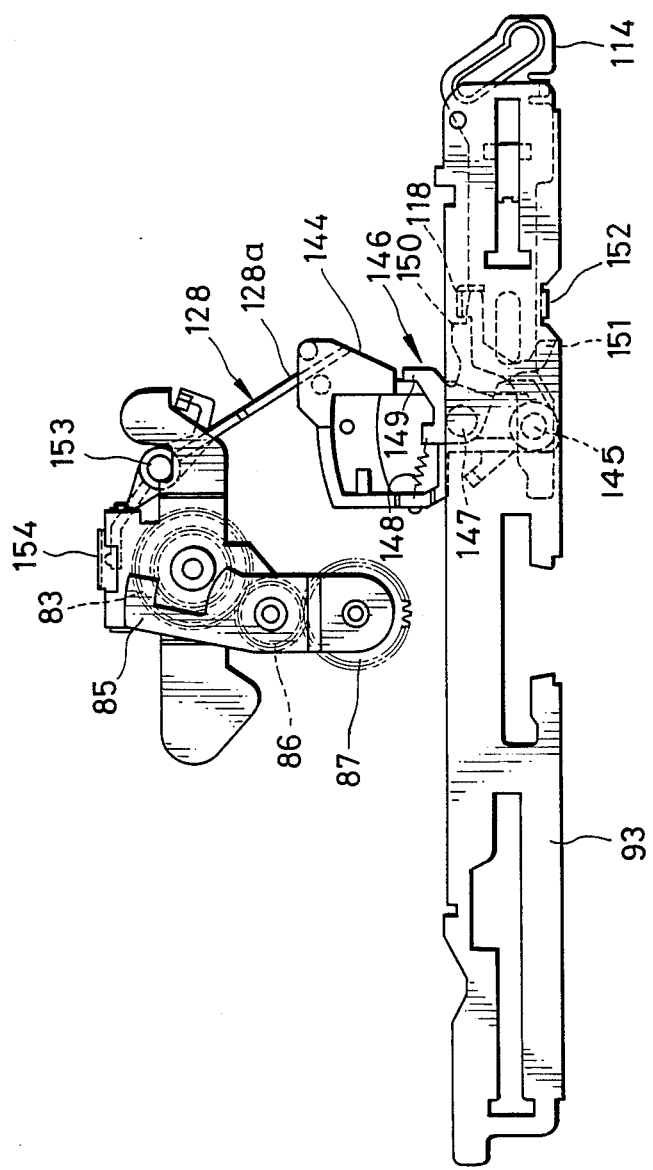
FIGS. 29(A), (B) through 31 are plane views showing motion of a clutch actuator in a stopping mode, fast forward/reverse mode and still mode; but FIG. 29(B) is a perspective view.
Figure 30:
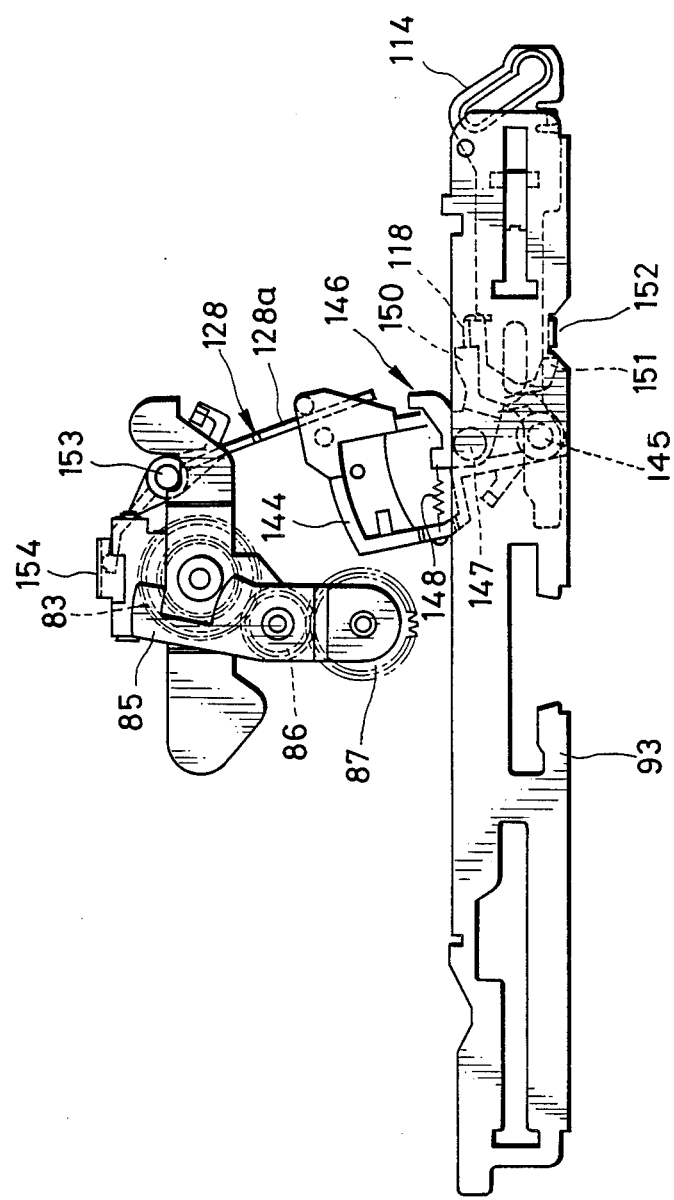

The fourth control plate 114 is moved leftward in FIG. 29(A) so that the projection 118 abuts against one leg 150 to cause the pin 147 to turn counter-clockwise about the pin 145. Consequently, the main lever 144 turns about the pin 145 and the elongated member 128a is turned clockwise about a pin 154 while being elastically deformed, whereby a third lever 154 causes the input gear 84 to be directly coupled to the main gear 81 (see FIG. 30). In this state (fast-forward/rewind), the member 128a of the actuator 128, owing to its resiliency, attempts to return the main lever 144 in the clockwise direction together with the spring 148. As a result, when the fourth control plate 114 is moved rightward, the two levers 144, 146 are placed automatically in the state shown in FIG. 29(A) by the resiliency of member 128a and the spring 148.

Figure 31:
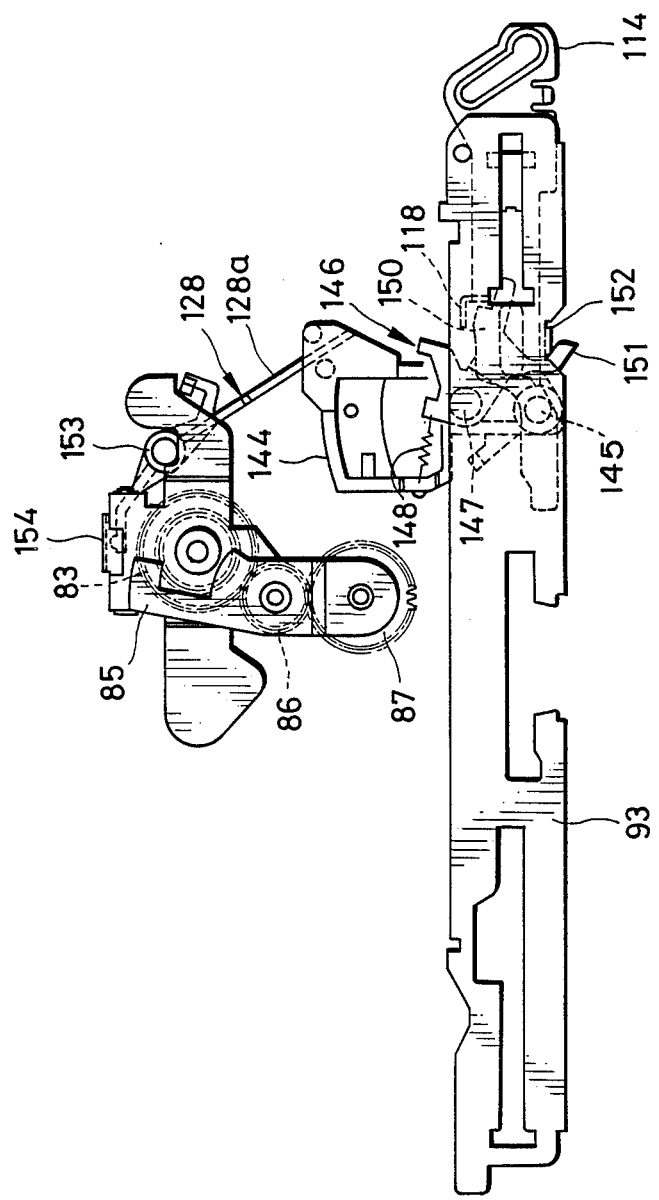

In the still mode, the fourth control plate 114 is moved leftward in order to actuate the capstan brake 115. At this time, therefore, the member 118 pushes the leg 150 to establish the directly coupled state of the gears. It is necessary to avoid this. On the other hand, in the still mode, the second control plate 93 is moved leftward in order to actuate the back-tension lever 21. Therefore, this motion is utilized to abut the projection 152 against the other leg 151. This abutting contact turns the auxiliary lever 146 clockwise about the pin 147 and situates the leg 150 at the lower side of the projection 118 (see FIG. 31). In consequence, even if the fourth control plate 114 is moved leftward for the purpose of actuating the capstan brake 115, the member 118 and the leg 150 do not come into abutting contact. Thus, in the still mode, the gears are not directly coupled and rightward motion of the second control plate 93 places the auxiliary lever 146 in the state shown in FIG. 29(A) owing to the spring 148.

The construction of the VTR 1 serving as one embodiment of the invention is as set forth above. Operation of this embodiment in each of its modes will now be described.

During cassette loading for loading a cassette at its predetermined position in the main body of the mechanism, the pin 110 moves toward point E (FIG. 28) upon passing through point G in the third cam groove 108. At this time the projection 38a of the first control plate 38 is situated at the right of the ratchet 131 of the slide plate 109, so that the ratchet 131 abuts against the projection 38a during the course of rightward movement of the slide plate 109. With further rightward movement, the ratchet 131 turns clockwise about pin 131a so that the ratchet 130 is lifted counter-clockwise about the pin 129. As a result, the slide plate 109 is moved leftward under the force of spring 133 without engaging the rotary shaft 135. (In FIG. 28, the pin 110 moves from point G to point E and then shifts suddenly from the cut-away part of the dotted raised portion to point F.) Preparations are made for the tape loading operation, which is next. During tape loading, the pin 110 moves from point F to point A along wall surface 140 of the cam groove 108.

(STOP→FAST-FORWARD/REWIND)

Figure 23:
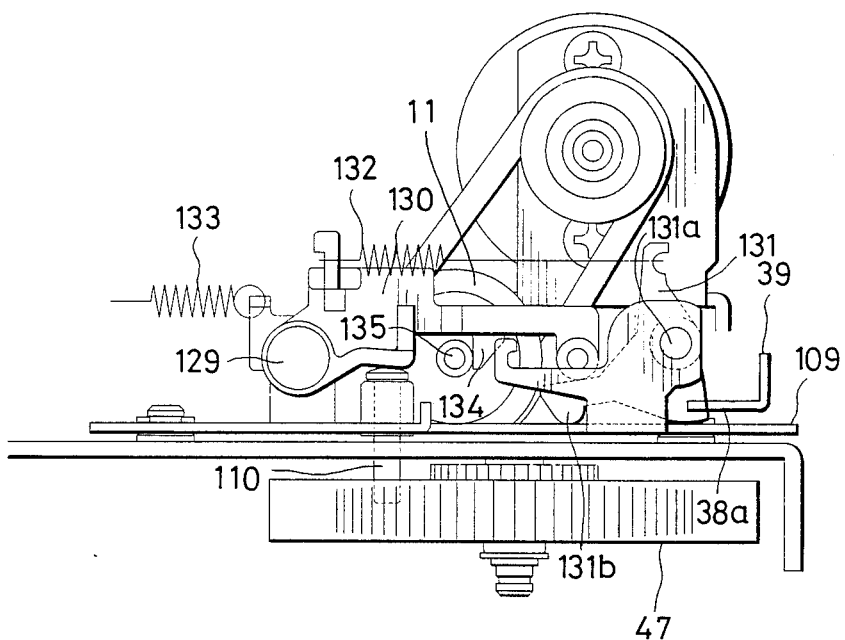
Figure 28:
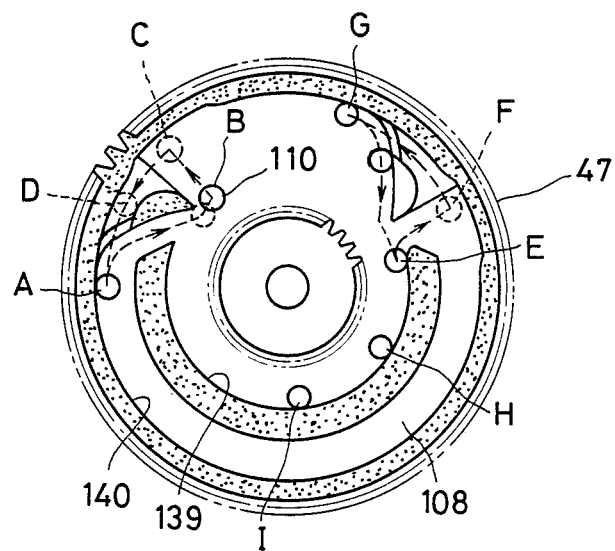
FIG. 28 is a plane view showing motion of a pin along a third cam groove.

When the VTR has been stopped, the pin 110 is at the position A in the third cam groove 108 shown in FIG. 28. However, owing to counter-clockwise rotation of the second cam gear 47, the pin 110 moves to point B, the slide plate 109 is moved rightward, the third control plate 113 is moved forwardly and the fourth control plate 114 is moved leftward via link 112, the S- and T-side main plates 119, 120 are separated from the two intermediate gears 74, 75, the capstan brake 125 is separated from the capstan motor 23 and the clutch 128 directly couples the main gear 81 to the follower gear 85. As the pin 110 is moving from point A to point B, the fourth cam groove 89 causes the second control plate 93 to release the T-side soft brake 94 from the T-reel table 26, and the S-side main plate 119 is placed in the free state along with the control plate 93. Thus, a transition is made from the state of FIG. 19 to the state of FIG. 23. In the state of FIG. 23, the tape is taken up directly by rotation of the capstan motor 23. Fast-forward/rewind (FF/REW) is performed at the position B in FIG. 28.

At fast-forward/rewind, the projection 118 of the fourth control plate 114 pushes the leg 150 and the clutch is engaged by the actuator 128 to placed the gears in the directly coupled state.

Figure 19:
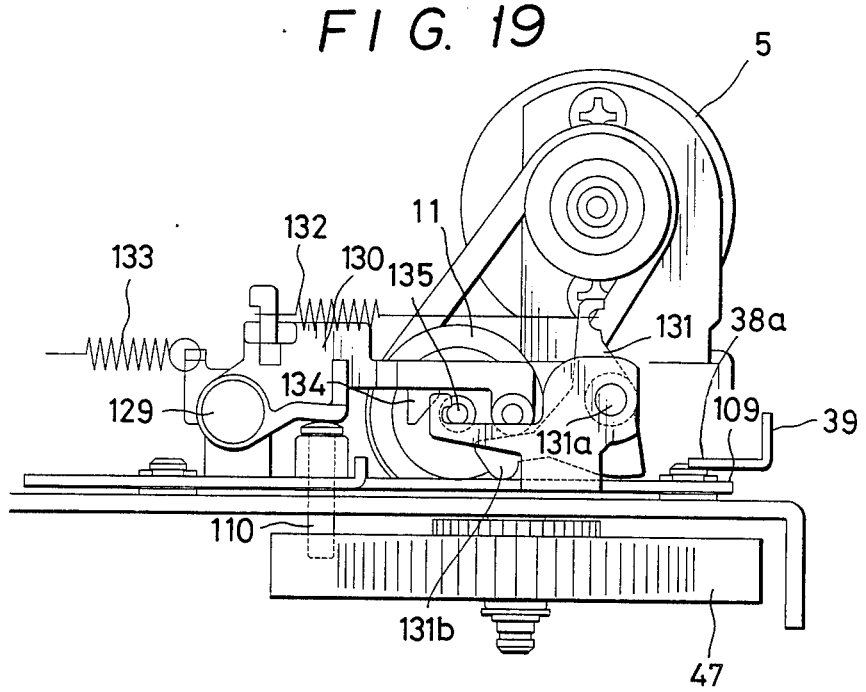

The relationship between the slide plate 109 and the pin 110 will now be described with reference to FIGS. 19 through 23. When the VTR has been stopped, the pin 110 is situated at point A in FIG. 28. In this state the slide plate 109 and ratchet 130 are positioned as shown in FIG. 19. When a fast-forward/rewind signal is received, the drive motor 5 rotates in the clockwise direction (see FIG. 20) so that the rotary shaft 135, which is rotated by pulley 11, also rotates in the clockwise direction. Meanwhile, since the second cam gear 47 rotates counter-clockwise (see FIG. 28), the pin 110 moves in the direction of B' so that the slide plate 109 is moved rightward (see FIG. 20). At this time the control plate 134 of ratchet 130 is moved to the right while it is being turned counter-clockwise about pin 129 along rotary shaft 135. When it eventually passes the center of the rotary shaft, it is turned clockwise by the force of spring 132 and finally assumes the state depicted in FIG. 22. The state of FIG. 22 indicates that the pin 110 is at the position B' in FIG. 28. In the present embodiment, the drive motor 5 is actuated to move the pin 110 up to point B. Since the pin 110 which has arrived at point B separates from the cam wall surface, it attempts to move toward point C along with the ratchet 130 and slide plate 109 under the biasing force of spring 133. However, the face of braking plate 134 opposite its inclined face and the rotary shaft 135 come into abutting contact so that leftward movement of ratchet 130 is limited. Accordingly, the state shown in FIG. 23 is obtained, in which state fast-forward/rewind is carried out.

(FAST-FORWARD/REWIND→STOP)

Figure 24:
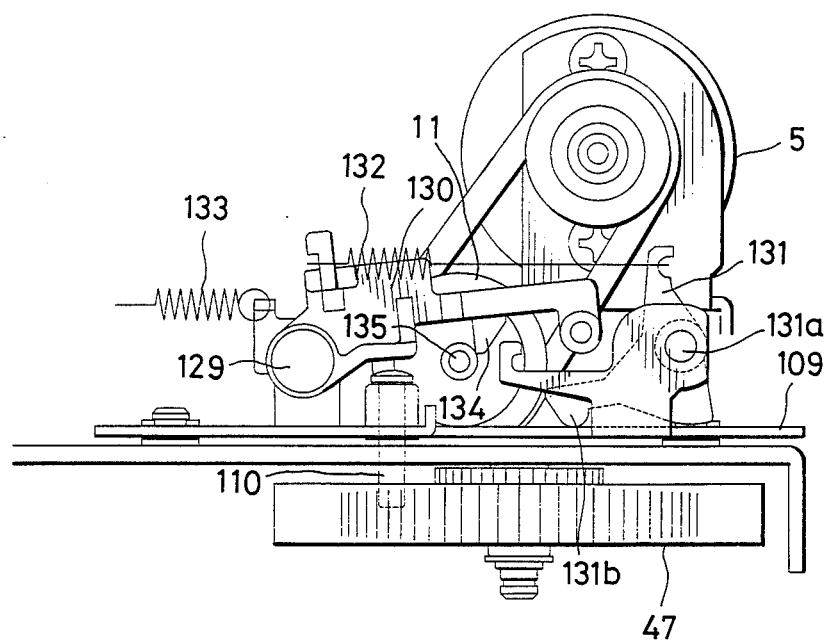
Figure 25:
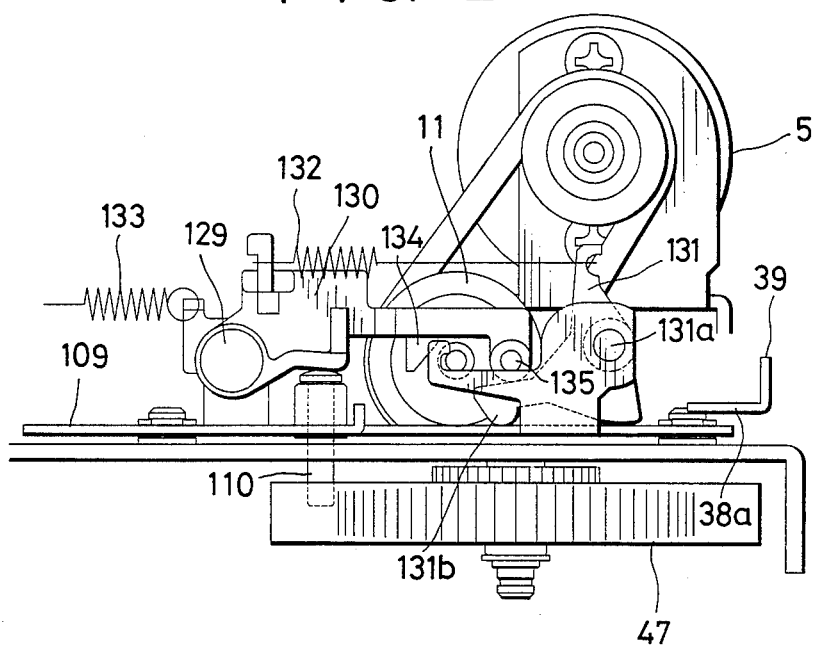
Figure 26:
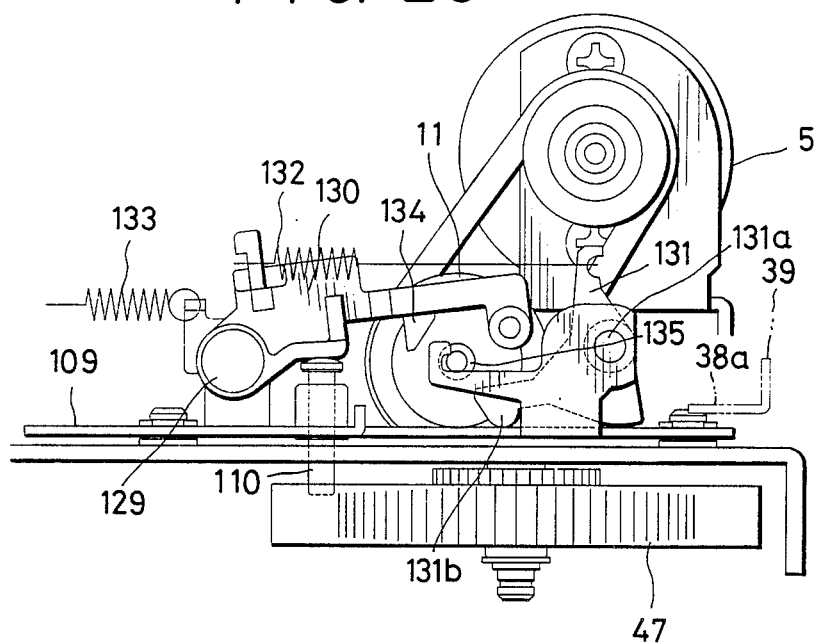

In the fast-forward/rewind (FF/REW) mode, the pin 110 is at the position of point B in the third cam groove 108. In response to a stop signal, an FG brake is applied to the capstan motor 23, i.e., electrically braking is applied by reverse biasing, and the drive motor 5 is reversed to rotate counter-clockwise in FIG. 23. When this occurs, the braking plate 134 causes the ratchet 130 to jump up instantaneously owing to the friction between the plate 134 and the rotary shaft 135 (see FIG. 24). As a result, the slide plate 109 is moved leftward (see FIG. 25) instantaneously by the spring 133, so that the pin 110 is moved from B to C in the cam shaft 108. The clockwise rotation of the second cam gear 47 causes the pin 110 to move from point D to point A via the lifting tapered surface (the state shown in FIG. 26), so that a transition is made from the state of FIG. 23 to the state of FIG. 19. The instantaneous motion of pin 110 from point B to point C moves the third control plate 113 rearward and the fourth control plate 114 rightward immediately so that the S- and T-side main brakes 119, 120 brake the intermediate gears 74, 75 and the capstan brake 115 brakes the capstan motor 23. Further, the clutch 128 is released and the rotation of main gear 81 is transmitted to the follower gear 83 (see FIG. 15) via the bypass gear 82 having the slip mechanism. During the movement of pin 110 from point C to point A via point D, the pin 110 is lifted by the tapered groove surface formed at a slant so as to rise from point C to point A only from C to A, as a result of which the braking plate 134 of ratchet 130 and the rotary shaft 135 are disengaged. It should be noted that the first and second control plates 38, 93 are actuated by the cam groove 89 of the second cam gear 47 during movement of pin 110 from C to A, so that portion 127 of the second control plate 93 is abutted against the S-side main plate 119 by this movement, thereby turning only the S-side main plate 119 counter-clockwise to release the braking force from the intermediate gear 74. As a result, tape tensile force produced at stopping of the tape is immediately released, thereby mitigating tape tension with respect to the cylinder head and preventing breakage of the tape (this is the state shown in FIG. 17). Furthermore, a connecting plate 92 releases the braking force which the T-side soft brake 94 applied to the T-reel table 26.

According to the present embodiment, in the case where a transition is made from the fast-forward or rewind state to the stop state, a mechanical braking force is applied instantaneously to the two reel tables by the main brakes 119, 120 to instantaneously stop the reel tables and prevent too much tape feed. A case can be conceived in which tape tension is increased too suddenly, resulting in risk of breakage, by this instantaneous braking operation. Accordingly, the FG brake is applied to the capstan motor 23 at the same time the transition is made from the fast/forward or reverse mode to the stop mode. In other words, electrical braking is applied by reverse biasing. As a result, the rotational speed of capstan motor 23 decreases somewhat after a slight delay time (ΔT), at which point in time the drive motor 5 is actuated and instantaneous braking is applied by the main brakes 119, 120. This makes it possible to prevent a sudden increase in tape tension while minimizing extra tape feed.

In this case, it is necessary to adopt an arrangement in which, at the moment the end of the tape (namely a tape leader or trailer) is sensed by a tape-end sensor mechanism comprising an LED and a light-receiving element, the main brakes 119, 120 are actuated instantaneously at the same time that the FG brake is applied to the capstan motor 23, thereby to stop the tape and prevent severing of the tape at the end thereof.

(STOP→PLAYBACK)

When a playback signal is received, the pinch roller 64 is pressed against the capstan 22 prior to the still mode by the first cam groove 58 of the first cam gear 12 and the pinch arm 66. Meanwhile, the clutch 128 meshes the main gear 81 with the bypass gear 82 in the stop mode. However, at passage through the fast-forward/rewind mode, the main gear 81 is coupled directly to the follower gear 83 by the motion of the fourth control plate 114 designated by the third cam groove 108. Further, when the transition is made to the playback mode, the main gear 81 is meshed with the bypass gear 82, which has the slip mechanism, by motion of the second control plate 93 designated by the fourth cam groove 89. Meanwhile, the fourth cam groove 89 moves the second control plate 93 leftward, the bell crank 104 is turned counter-clockwise and the lever 103 is turned clockwise, so that the band brake 107 is made to act upon the S-reel table 25 by the tension lever 21 to apply back tension to the tape. At this time the connecting plate 92 causes the T-side soft brake 94 to separate from the T-side table, and the fourth control plate 114 causes the capstan plate 115 to separate from the capstan motor. In addition, the two main brakes 119, 120 are separated from the respective intermediate gears 74, 75 by leftward movement of the second control plate 93. Also, the S-side soft brake 98 is separated from the S-side reel.

It should be noted that the pin 110 contacting the third cam groove 108 is moved to the E position in FIG. 28 through A-B at playback. In the course of this motion, the control plate 134 contacts the rotary shaft 135 leftward movement of the slide plate 109 is limited.

[PLAYBACK→STILL (INCLUDING SLOW-MOTION)]

Figure 22:
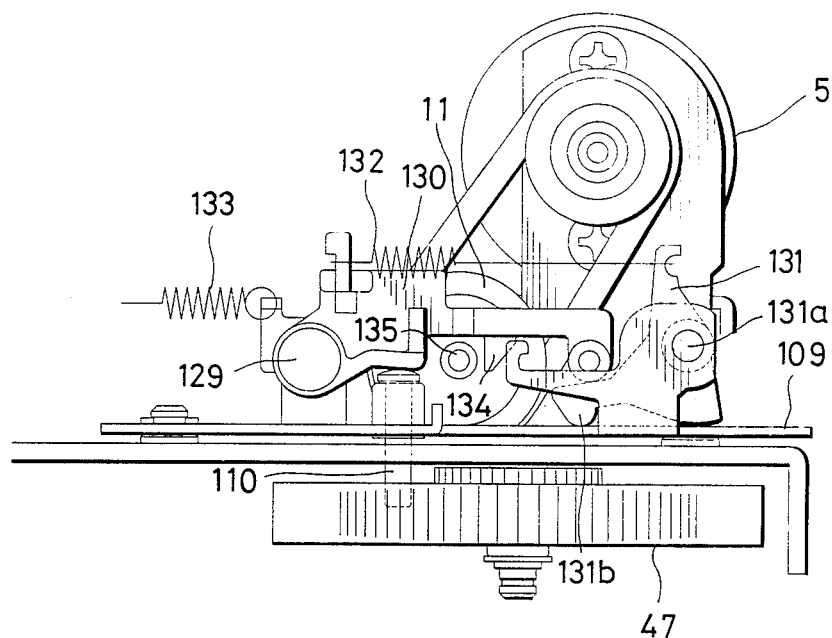

The state shown in FIG. 22 prevails and the drive motor 5 is at rest when the playback mode is in effect. When a still signal arrives, the motor 5 rotates in the reverse direction. Owing to counter-clockwise rotation of the rotary shaft 135, the braking plate 134 jumps up instantaneously (see FIG. 24) from the rotary shaft 135 by using the friction of the braking plate, and the slide plate 109 is moved leftward (see FIG. 25) so as to move the pin 110 from E to F. The clockwise rotation of the second cam gear 47 lifts the pin 110 (see FIG. 26) since the pin traverses the tapered groove surface (the groove surface is inclined so as to rise from F to G just as from C to A). The ratchet 130 is turned counter-clockwise about the pin 129 to disengage the braking plate 134 and rotary shaft 135. When the still mode is established, the pin 110 shifts from F to G. The pin descends again at point G to establish the state shown in FIG. 19.

When the slide plate 109 is moved leftward instantaneously as a result of the braking plate 134 jumping up from the rotary shaft 135, the spring 137 immediately retracts the third control plate 113 and the projection 118 is immediately moved rightward (see FIG. 17) so that the capstan brake 115 is made to act pon the capstan motor instantaneously.

In this state the portion 138 of second control plate 93 abuts against a portion of the T-side main brake 120 and the two main brakes 119, 120 placed in the released state. Furthermore, in the still mode, the state of FIG. 31 prevails. Accordingly, the clutch actuator 128 employs the power transmission path which uses the bypass gear 82 having the slip mechanism.

(STILL→PLAYBACK)

The pin 110 moves from G to E in FIG. 28 and the ratchet 130 moves as shown in FIGS. 19 to 22. The rightward movement of slide plate 109 advances the third control plate 113 via link 112 against the biasing force of spring 137. The movement of control plate 113 moves the fourth control plate 114 leftward to release the capstan brake 115. There is no change in the clutch 128 and two main brakes 119, 120.

(PLAYBACK→REVIEW)

In accordance with the change in this mode, it is necessary to separate the back tension lever 21 from the tape and abut the T-side soft brake 98 against the T-side reel table.

When the fourth cam groove 89 moves the second control plate 93 further to the left, the cam face 106 turns the bell crank 104 in the clockwise direction to turn the lever 103 in the counter-clockwise direction. Consequently, the tension lever 21 turns clockwise and the band 107 wound on the S-reel table 25 is loosened to release the back tension on the tape. The forward motion of the first control plate 38 makes it possible for the T-side soft brake 94 to contact the T-reel table 26 by virtue of spring 95, this being done with the intervention of the connecting plate 92.

(REVIEW→PLAYBACK)

In the review mode, the pin 110 moves from E to I. When a signal for returning from the review mode to the playback mode is delivered, the motor 5 rotates in the counter-clockwise direction and the pin 110 returns to the E position via the H position, which is for a pause. At this time the fourth cam groove 89 causes the back tension to be released from the tape and causes the T-side soft brake 94 to be released. Regardless of the fact that the pin 110 is turned counter-clockwise with respect to the cam groove 108, the wall surface 139 limits the leftward return of the slide plate 109 due to spring 133. In consequence, the rotary shaft 135 and braking plate 134 assume the state shown in FIG. 22 and do not disengage irrespective of the counter-clockwise rotation of motor 5.

(PLAYBACK→CASSETTE EJECTION)

According to the change in this mode, the motor 5 is reversed and the pin 110 traverses a path E→F→G→C→A→F (along wall surface 140). When the pin 100 moves from E to F, the fourth control plate 114 is moved rightward instantaneously.

As will be apparent from the foregoing description, a tape loading and pinch roller operation mechanism is coupled to the side of the first cam gear 12, a brake, clutch and tension mode operation mechanism is connected to the side of the second cam gear 47, and the mechanism operation section and control section are distinguished from each other for each and every cam gear. Thus, a small gear is arranged coaxially with respect to the second cam gear 47, which performs an important role in mode control, and the small gear is meshed with the gear 144 (FIG. 2) on the side of a rotary encoder (not shown). Accordingly, the angle of rotation from a reference point of the second cam gear 47 is sensed by the rotary encoder via gear 144 and, on the basis of the detection signal from the rotary encoder, system control confirms each of the abovementioned modes and control the operation of each of the devices constituting the VTR.

Figure 16:
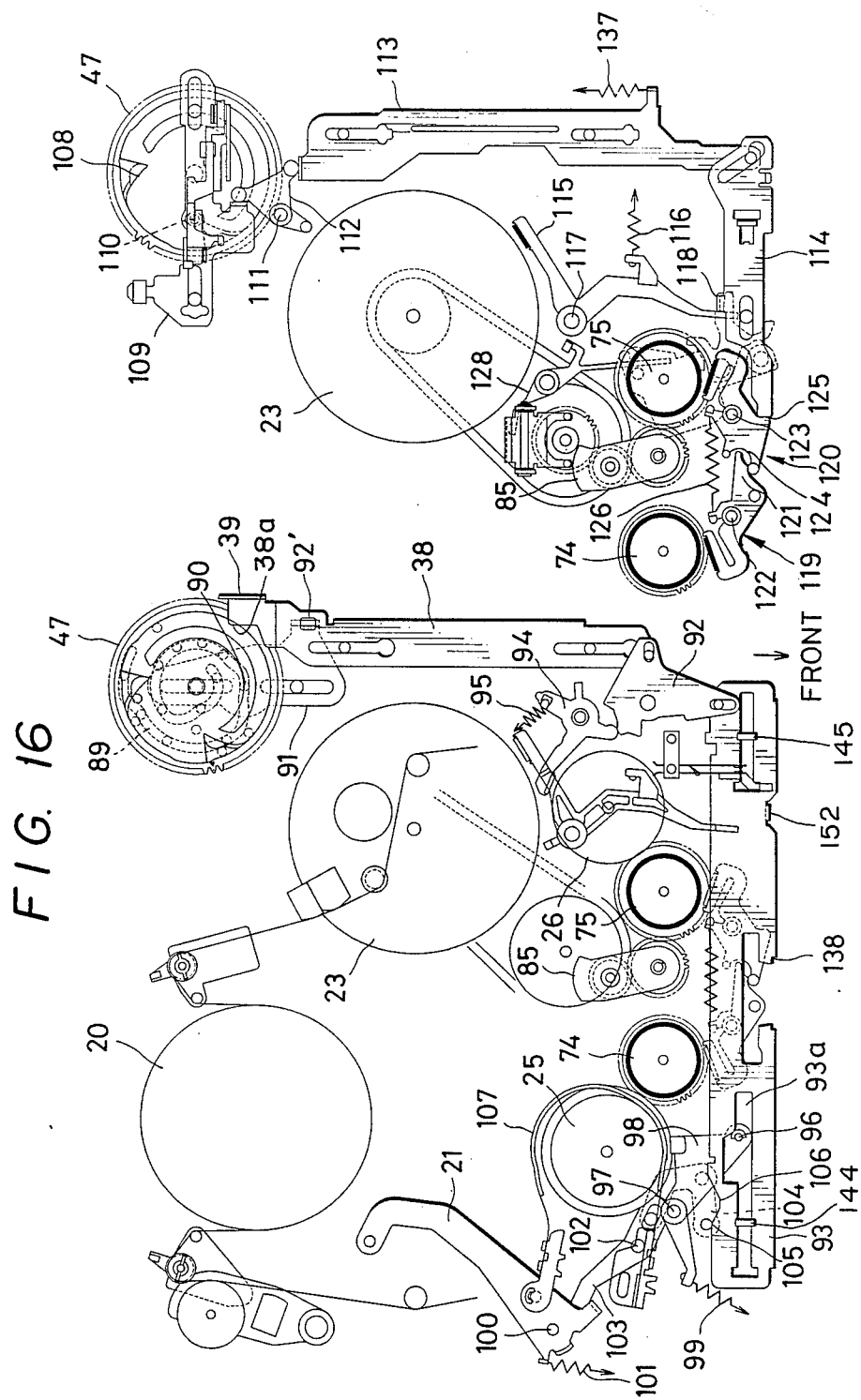
FIGS. 16 and 17 are plane views showing the motions of various parts actuated by a first cam gear.

As set forth above, the second and forth control plates 93, 114 reciprocate to the right and left, as seen in FIGS. 16 and 17, with respect to the chassis 71. Therefore, it is necessary to assure that the path of this motion will be fixed at all times. In general, pins are implanted in the chassis 71, the pins are passed through slots in the control plates 93, 114, and the reciprocating movement of the control plates 93, 114 is guided by a combination of these pins with the slots. However, in the present embodiment, as illustrated in FIG. 14, upstanding pieces 144, 145 are formed on the chassis 71 and take the place of these pins. The upstanding pieces 144, 145 are approximately perpendicular to the chassis and have broadened distal ends. Accordingly, one end of each of the slots in the control plates 93, 114 that receive these upstanding pieces 144, 145 is widened in a direction perpendicular to the longitudinal direction of the slot, as shown in FIG. 17, so that the upstanding pieces 144, 145 can be inserted into their respective slots. The upstanding pieces 144, 145 not only serve to guide the control plates 93, 114 but also use their distal end portions as members for supporting the cassette in parallel relation to the chassis 71. One component therefore is capable of performed two functions. In addition, the upstanding pieces 144, 145 can be formed at the same time that the chassis 71 is machined. This makes unnecessary an attachment between pins and a cassette supporter.

As for the advantages of the present invention, the motor and the cassette loading mechanism are completely separated from each other during tape loading (there is no idling of components on the cassette loading mechanism side), and hence there is little load on the motor. Furthermore, if a cassette becomes stuck, the motor is forcibly stopped from rotating so that slippage does not develop between the the tape loading and cassette loading mechanisms.

As many apparently widely different embodiments of the present invention can be made without departing from the spirit and scope thereof, it is to be understood that the invention is not limited to the specific embodiments thereof except as defined in the appended claims.

What we claim is:

1. A magnetic recording/playback apparatus in which rotational torque from a drive shaft of a single motor is capable of being transmitted to a cassette loading mechanism for loading a cassette onto the apparatus and a tape loading mechanism for loading tape in the cassette onto a guide drum to operate said mechanisms, comprising:
   a worm secured to the drive shaft;
   a worm wheel for being meshed freely with said worm and for coupling the drive shaft to the cassette loading mechanism, said worm wheel having a toothed portion and a toothless portion; and
   a worm wheel turning means for bringing said toothless portion of said worm wheel to a position opposite said worm during operation of the tape loading mechanism by the drive shaft.

2. The apparatus according to claim 1, wherein said worm wheel turning means comprises:
   a cam surface formed integral with said worm wheel and having a groove defining a groove surface; and
   a spring-biased pin capable of sliding freely on said cam surface;
   wherein when said pin is received within the groove, said pin applies a thrusting force against the groove surface, thereby turning said worm wheel so as to unmesh said worm and said worm wheel by bringing said toothless portion of said worm wheel to said position opposite said worm.

3. The apparatus according to claim 2, wherein when said pin is withdrawn from the groove by motion of a slide plate constituting the tape loading mechanism, said pin applies a thrusting force against the groove surface, thereby turning said worm wheel so as to mesh said worm and said toothed portion of said worm wheel.

* * * * *